United States Patent [19]

Ledley

[11] 4,229,797

[45] Oct. 21, 1980

[54] METHOD AND SYSTEM FOR WHOLE PICTURE IMAGE PROCESSING

[75] Inventor: Robert S. Ledley, Silver Spring, Md.

[73] Assignee: National Biomedical Research Foundation, Washington, D.C.

[21] Appl. No.: 940,052

[22] Filed: Sep. 6, 1978

[51] Int. Cl.² .................. G06F 15/20; H04N 7/18
[52] U.S. Cl. .................................... 364/515; 358/37; 358/106; 358/166
[58] Field of Search ............... 364/515; 358/105, 106, 358/36, 37, 166

[56] References Cited

U.S. PATENT DOCUMENTS

| | | | |
|---|---|---|---|
| 3,889,053 | 6/1975 | Lloyd et al. | 358/106 |
| 3,920,889 | 11/1975 | Connor | 358/166 |
| 3,987,244 | 10/1976 | Messman | 358/106 |
| 3,996,421 | 12/1976 | Pruznick et al. | 358/166 |
| 4,079,416 | 3/1978 | Faani et al. | 358/106 |
| 4,142,211 | 2/1979 | Faroudja | 358/36 X |

Primary Examiner—Jerry Smith
Attorney, Agent, or Firm—John J. Byrne

[57] ABSTRACT

A method and system for whole picture image processing achieves automatic texture and color analysis in a rapid and economical manner. The method involves the generation of texture parameters as a result of processing image data for a whole picture at a time. The system comprises a plurality of image memories for storing digital image data, and a high speed video processor which obtains whole picture image data and processes same so as to analyze such whole picture image data at high speeds. The system also includes a video crossbar switch, master and slave timing control units, and a transformation unit associated with each image memory.

35 Claims, 24 Drawing Figures

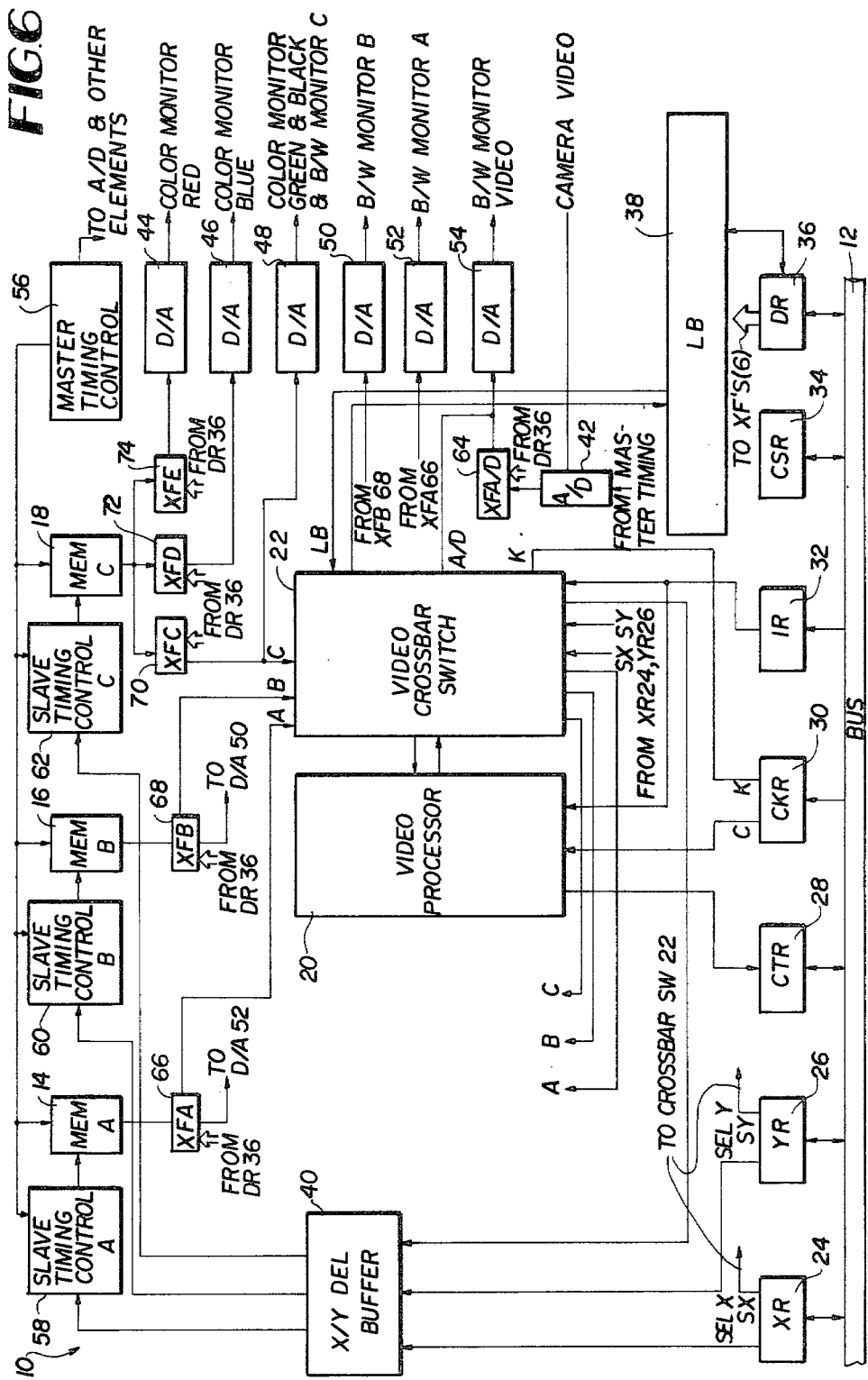

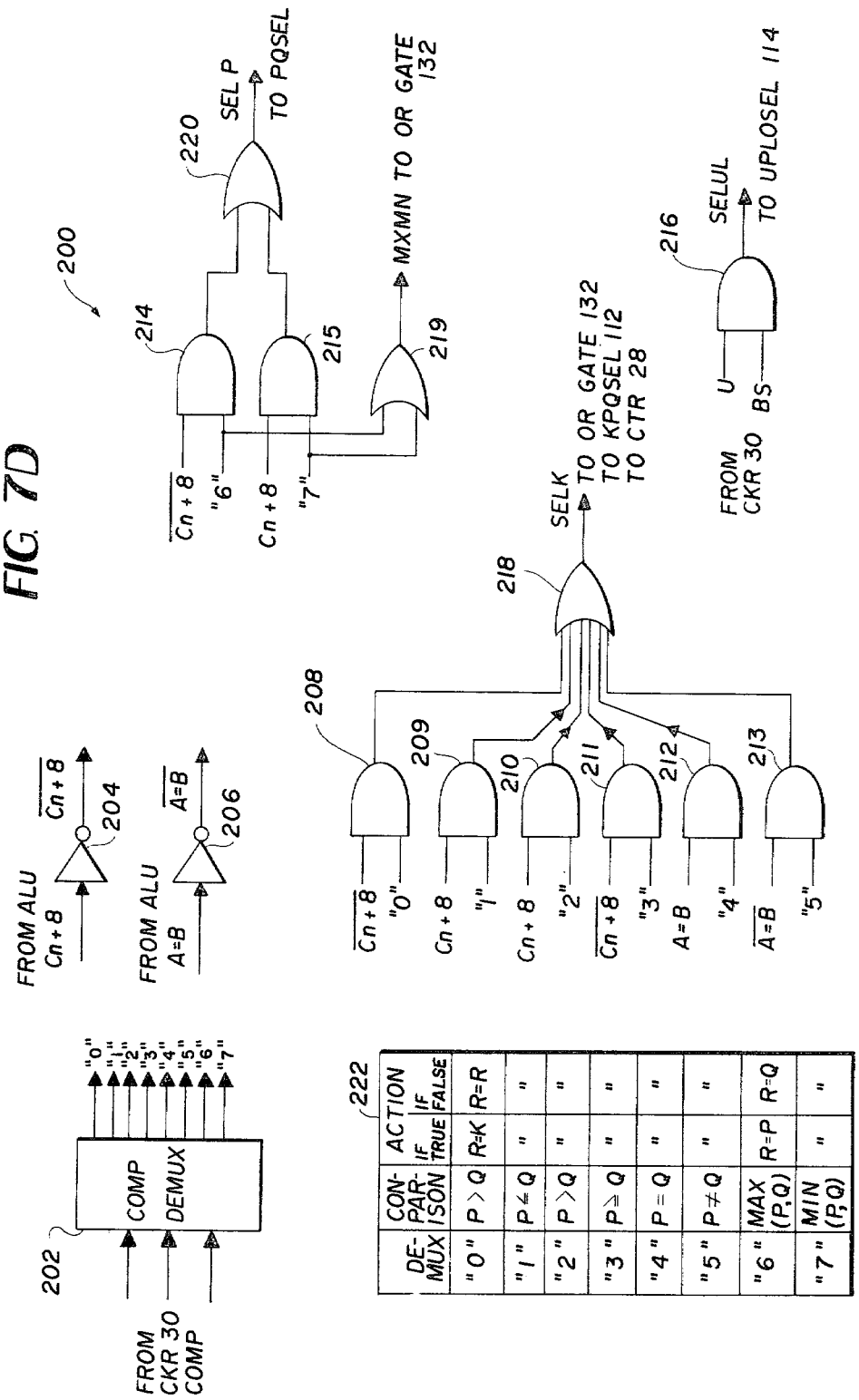

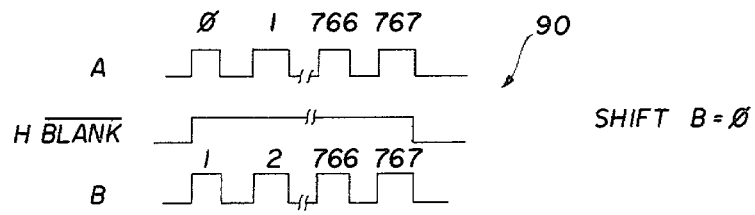
A SHIFT = Ø, B SHIFT = Ø, H BLANK PER A (AND B), DELAYS = Ø
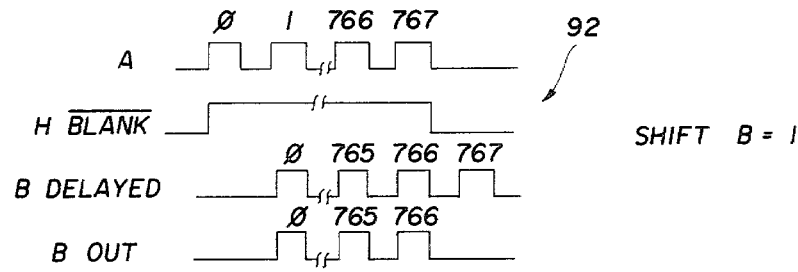
A SHIFT = Ø, H BLANK PER A, B SHIFT = +1
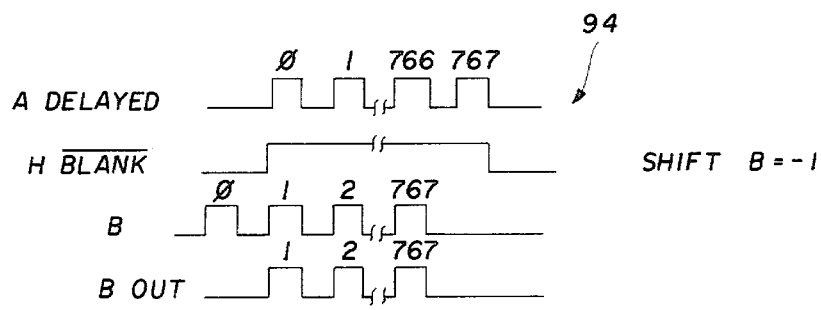
A SHIFT = Ø
B SHIFT = −1
THEREFORE, DELAY A AND H BLANK BY 1 ELEMENT
FIG 8B

FIG. 10A
FIG. 10B
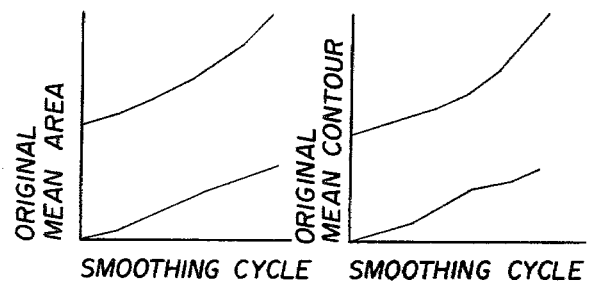
FIG. 10C
FIG. 10D
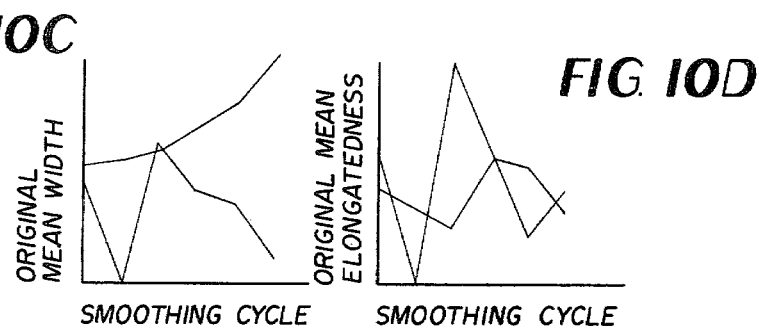
FIG. 10E
FIG. 10F
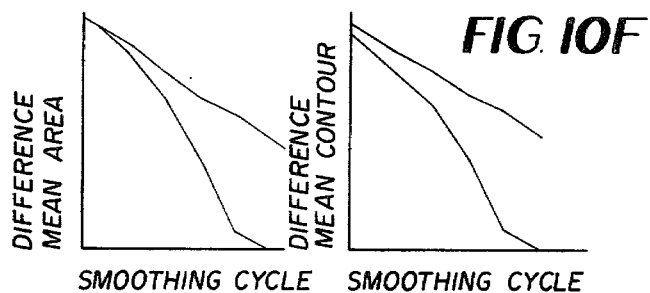
FIG. 10G
FIG. 10H
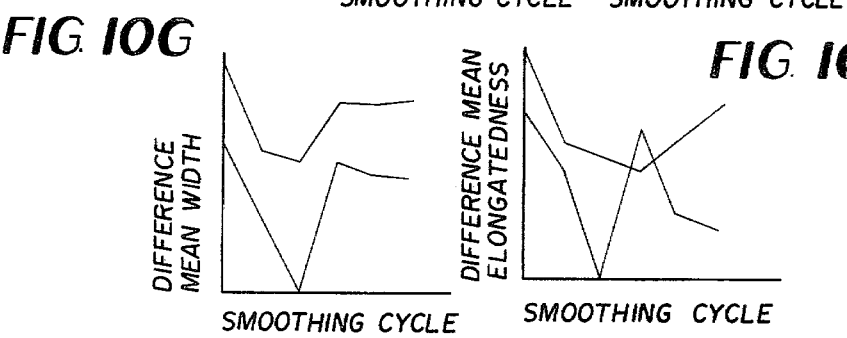

METHOD AND SYSTEM FOR WHOLE PICTURE IMAGE PROCESSING

BACKGROUND OF THE INVENTION

1. Field of the Invention

The present invention relates to a method and system for whole picture image processing and, more particularly, a method and system for automatic texture and color analysis of images in accordance with rapid, whole picture processing for the purpose of achieving automatic classification of the images in accordance with certain predetermined standards.

2. Description of the Prior Art

Radiography has for many years been an essential tool in the fields of diagnostic and preventive medicine, and industrial quality control, among others.

With the advent of television, systems and methods of examining X-ray pictures by the use of closed-circuit networks were incorporated into medical X-ray examination procedures. Both single-camera and dual-camera systems, as well as various analog circuitry arrangements for X-ray image analysis, were developed. See, for example, U.S. Pat. No. 3,283,071—Rose et al.

Additionally, various digital systems were utilized, in conjunction with closed-circuit television networks, to convert radiographic images produced by an irradiated test object and a corresponding radiographic image produced by an irradiated reference object into corresponding video signals, which were then processed (such as, by comparator circuitry) so as to be electronically interpreted without human intervention. See, for example, U.S. Pat. No. 3,580,997—Webb et al.

In more recent years, sophisticated automatic pattern recognition procedures and algorithms have been developed, and this development has facilitated the analysis and processing of images (such as X-rays) by conventional digital data processing techniques and systems. However, many of the most important potential applications of computer pattern recognition, particularly in the field of clinical medicine, have not yet been successfully carried out on a feasible basis because of one fundamental difficulty.

The applications, such as the analysis of chest X-rays, Papanicolaou smears, differential white blood cell counting, and so forth, require an evaluation of the "texture" of the objects in the picture as an essential parameter for successful pattern recognition. The techniques presently used—the classical curvilinear boundary analysis techniques, counting algorithms, and gray-level histograms—have proved to be inadequate because these methods are unable to recognize the texture variations that are an essential characteristic feature of biomedical picture data. Thus, the indentification and quantification of the nature and extent of lung opacities, cytoplasmic and nuclear granularity, etc. (which are vital to clinical diagnosis and biomedical research) require new methods for evaluating the texture of areas of the picture.

The texture of a picture (or a scene) is characterized by many repetitive variations of subpatterns within the overall pattern, according to well-defined placement rules. The subpatterns can be spatial variations in intensity and/or wave length. Texture analysis by a digital computer involves a type of computing that is presently extremely time consuming and therefore very expensive. This is due to the fact that texture analysis involves the comparison of each picture point (or a selected collection of points) with every other point (or every point in some neighborhood around the selected points) of the picture. Since a digital computer can work with only one point at a time (or, at most, only a few points that can be packed into a single computer word), the number of instructions that must be executed is some multiple of KN, where N is the number of points in the picture and K is related to the size of the neighborhood that will be involved around each point.

For example, suppose the picture to be analyzed for texture has 500 lines and 500 picture points per line, thus making $N=250,000$, and the reasonable neighborhood size is 20 points $\times 20$ points, making $K=400$. If picture analysis is performed by digital data processing, and if 10 assembly-language instructions are required per neighborhood operation, then $250,000 \times 400 \times 10 = 10^9$ instructions must be executed for each complete picture-texture operation. Assuming that the computer executes $10^6$ instructions per second, each texture-type operation would take $10^9/10^6 = 10^3$ seconds or 16.7 minutes. Thus, the cost of executing a reasonably useful algorithm would be quite astronomical.

In conventional computer systems for processing image data, system memory is typically broken down into bits, bytes and words, and each individual byte or word has a unique address. Accordingly, the steps of accessing a word from memory, performing the required operation, and storing the result back into memory consume an inordinate amount of time when an entire picture operation is being executed by such a system.

Furthermore, in conventional systems, visual display of results is not available without reading the picture back from the memory, point by point, and converting it into analog form for TV display.

Whereas conventional systems are capable of accomplishing texture analysis—even though in a time-consuming and inefficient manner—colored data developed during image detection procedures can only be analyzed in a qualititive way, there being presently available no method and system for analyzing such colored data both quantitatively and rapidly.

SUMMARY OF THE INVENTION

Therefore, according to the present invention, there is provided a method and system for whole picture image processing and, more particularly, a method and system for automatic texture and color analysis of images in accordance with whole picture processing for the purpose of automatic classification of such images in accordance with certain predetermined standards.

Specifically, the method and system for image processing involves the generation of certain texture parameters which describe defined picture attributes of the image as functions of picture gray levels. For example, for each of the several attributes, spectra are generated and, for each spectra, the first, second and third moments (i.e., mean, variance and skewness, respectively) and an average are computed. The produced parameters are then compared with parameters derived from predetermined standards (e.g., UICC/Cincinnati Standard Pictures) to classify the detected image.

The system of the present application comprises a specialpurpose system which develops the aforementioned parameters for the image (e.g., X-ray), and compares them with the predetermined standards. The special-purpose system is controlled by a main computer, and operates on digitized representations of the image so as to produce an average (smoothing) of the picture. This smoothing is performed repeatedly, and a spectrum of points (in accordance with gray levels) is obtained for each smoothed picture. For each of a plurality of partitions of the picture—again, in accordance with the gray levels—four attributes are selected: area, boundary length, width and proportion. Then, the first, second and third moments (mean, variance and skewness, respectively) of each attribute are computed.

In the latter manner, a matrix of parameters—corresponding to the X-ray image—is obtained for each smoothing cycle. Moreover, a similar matrix of parameters—corresponding to what is typically called the "difference picture"—is obtained by means of point-by-point subtraction of the average picture from the original picture. Furthermore, the number of local maxima per unit area is obtained from the difference picture. In the latter manner, the parameters generated by the special-purpose system are compared with standard parameters (developed as described above) in order to classify the X-ray or image.

The system for image processing comprises the following basic elements: a plurality of image memories (preferably, at least three) for storing digital image data; a high-speed video processor unit for interpreting various computer commands received from a main computer, and for executing such commands by performing various basic computer operations (add, compare, shift, etc.); a digital video crossbar switch for routing data from and to the memory units and the video processor unit; various input/output/interfacing units (to be described below); various registers and buffers (also to be described below); and various timing control units, including slave timing units associated with and controlling respective image memory units, and a master timing control unit for providing sync signals to the various slave timing units, and a sync and blanking signal to a TV camera associated with the system for image processing.

Each of the memory units, preferably, can store data corresponding to a complete image or picture, and the system for image processing includes a specially designed video processor unit which has the capability of operating on the image or picture as a whole in accordance with a texture analysis technique (to be disclosed in detail below). As a result, the video processor is able to perform a type of computing that is presently extremely time-consuming (and, therefore, very expensive), and thus to recognize the texture variations—which are an essential characteristic feature of biomedical picture data—in a rapid and economical manner.

Furthermore, in view of the ability of the video processor to operate on the picture data as a whole and in a rapid manner (corresponding to TV scan rates), the system for image processing is able to display processing results continuously.

The system for image processing not only performs texture analysis of image data in a rapid and economical manner, but also—by virtue of its plurality of picture memories—lends itself readily to color scanning. This has signficant advantages for biomedical use since pathologists recognize the significance of color in the analysis of cytologic specimens.

Therefore, it is an object of the present invention to provide a method and system for image processing and, in particular, a method and system for automatic texture analysis of images for the purpose of automatic classification of the images in accordance with certain predetermined standards.

It is an additional object of the present invention to provide a method and system for automatic color analysis of images for the purpose of automatic classification of images in accordance with predetermined standards.

It is an additional object of the present invention to provide a method and system for image processing so as to perform whole picture texture-analysis operations very rapidly and economically.

It is a further object of the present invention to provide a system for image processing which operates on the whole picture independent of a main computer.

It is a further object of the present invention to provide a method and system for image processing so as to operate on the picture as a whole at high rates, corresponding to TV scan rates, and thus, to display the processing results continuously.

With the above and other objects in view that will hereinafter appear, the nature of the invention will be more clearly understood by reference to the following description, the appended claims, and the accompanying drawings.

BRIEF DESCRIPTION OF DRAWINGS

FIG. 6 is a block diagram of the basic system for image processing of the present invention;

FIGS. 7A through 7D are detailed block diagrams of the various elements of the video crossbar switch and video processor of the system of the present invention;

FIG. 8B is a timing diagram relative to the slave timing control units of the system of the present invention;

FIGS. 10A through 10D are graphical representations of the first moment (mean) curve of an original X-ray picture for the area, contour, width and elongation, respectively, of two X-rays of different severities of pneumoconiosis; and FIGS. 10E through 10H are graphical representations of the first moment (mean) curves of the difference pictures for the area, contour, width and elongatedness, respectively, of X-rays of different severities of pneumoconiosis.

DETAILED DESCRIPTION

The invention of the application will now be more fully described with reference to FIGS. 1A and 1B which are graphical representations of texture data, utilized for describing the texture analysis technique of the present invention.

Various concepts of texture and texture analysis, the definition of texture parameters, and the types of computer instructions ordinarily employed to manipulate pictorial data have been previously described in Ledley, R.S., "Texture Problems in Biomedical Pattern Recongition," *Proc. IEEE Conf. on Decision and Control,* 1972, and in Ledley, R.S., "Texture Problems in Biomedical Pattern Recognition," 11*th Symposium on Adaptive Processes,* December 1973. In order to introduce the concepts of texture and texture analysis for present purposes, the "linear case" (as opposed to the two-dimensional or "area case") will be first considered.

Figure 1A:
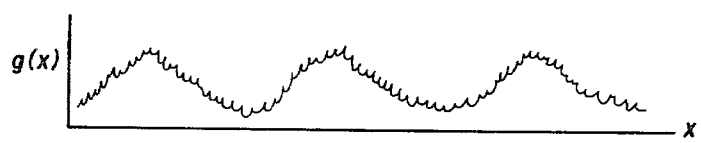
FIGS. 1A and 1B are graphical representations of texture data, utilized for describing the texture analysis technique of the present invention.
Figure 1B:

FIGS. 1A and 1B illustrate characteristic curves $g(x)$ and $h(x)$, respectively, representing different textures characterizing corresponding image or pictorial data. It is clear from FIGS. 1A and 1B that $g(x)$ certainly has a different texture than $h(x)$, in that $g(x)$ has a very small ripple superimposed on rather long undulations (where no periodicity is assumed), whereas $h(x)$ has a large ripple superimposed on shorter undulations.

Figure 2:
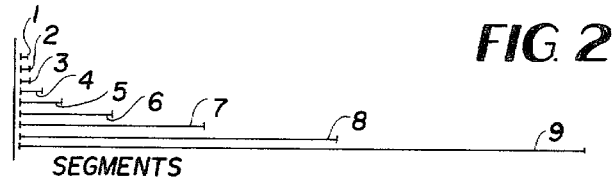
FIG. 2 is a graphical representation of a collection of segments utilized to describe the texture analysis technique.

FIG. 2 is a graphical representation of a collection of segments utilized to describe the texture and analysis technique. More specifically, FIG. 2 shows a collection of segments, designated by numerals 1-9, corresponding to the x-axis of FIGS. 1A and 1B. In developing FIG. 2, the x-axis is divided into successive segments of the length of segment 1. Then, a function $\bar{g}(x)$ is computed based on the values of the average of $g(x)$ over each x segment. Next, the numbers of maxima and minima per unit length of $\bar{g}(x)$ are counted. This counted number, in accordance with the curve $g(x)$ of FIG. 1A, will reflect the small ripple of that curve. The counting procedure is repeated for segments of the length of segment 2 (FIG. 2), then for segment 3, and so forth.

It will be noted that, after the procedure is performed with respect to segment 3, which covers several of the ripples of $g(x)$, these ripples will no longer be reflected in the number of maxima and minima per unit length, and only the larger undulations will be observed.

Figure 3:
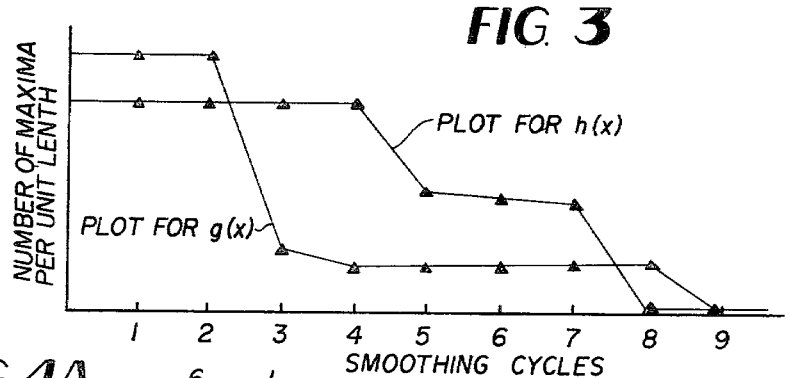
FIG. 3 is a graphical plot of the number of maxima per unit length vs. the segment length, as derived from FIGS. 1A, 1B and 2.

FIG. 3 is a graphical plot of the number of maxima per unit length vs. segment length, plotted for characteristic curves $g(x)$ and $h(x)$ of FIGS. 1A and 1B, respectively. It is to be noted that the plot for $g(x)$ (FIG. 3) starts high for the small ripple, but comes down considerably for larger undulations in $g(x)$. Conversely, the plot for $h(x)$ starts at a lower level for larger ripples, and has a higher plateau for the undulations. It is to be further noted that both plots of FIG. 3 approach zero for very long segments. It can, therefore, be concluded that locations of plateaus and heights of the plateaus (in FIG. 3) characterize the textures of $g(x)$ and $h(x)$ of FIGS. 1A and 1B, respectively. Of course, there are other characterizing features—such as, for instance, the average height of the ripples and undulations (as measured by the difference in the values of $g(x)$ between successive maxima and minima), the steepness of the sides of the ripples or undulations, and so forth.

The above-stated concepts of texture and texture analysis are quite analogous to those concepts encountered in the twodimensional (area) case. In such a case, the function $g(x)$ is replaced by the corresponding function $g(x,y)$. The twodimensional or area case is, of course, more realistic for clinical applications of texture analysis and techniques, since the value of $g(x,y)$—at any point having coordinates x, y—represents the gray level at that point. In the two-dimensional or area case, instead of averaging the values of $g(x)$ along segments—as was done in the linear case—the values of $g(x,y)$ are averaged within areas or "neighborhoods."

Figure 4A:
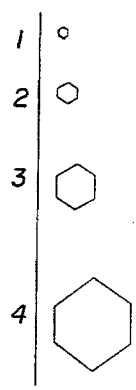
FIG. 4A shows various hexagonal areas or "neighborhoods," for describing the application of the texture analysis technique of the present application to the case of two-dimensional images.
Figure 4B:
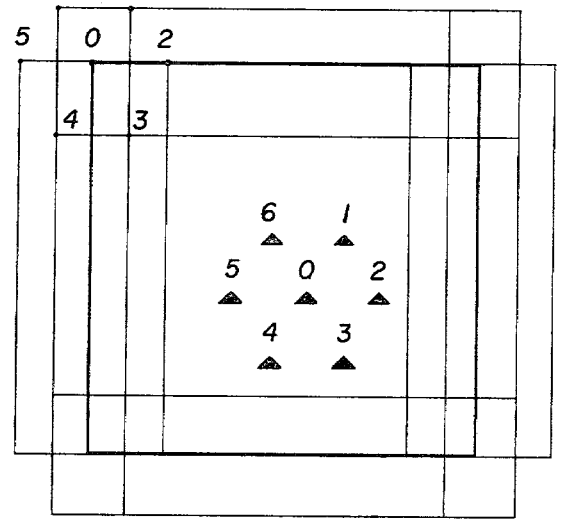
FIG. 4B is a pictorial representation utilized to describe the result of "displacing and adding" a picture to itself.

FIG. 4A shows various hexagonal areas or "neighborhoods," for describing the implementation of the texture analysis technique of the present application in the case of two-dimensional images. More specifically, in FIG. 4A, hexagonal areas of different sizes are shown, these areas being analogous to the segments of FIG. 2.

In the two-dimensional or area case, if we successively "displace and add" a picture to itself, then we obtain a new picture—that is to say, a new function $\bar{g}(x,y)$, each point or value of which is the average value over a neighborhood around the corresponding point of the original picture. As was the case with the function $\bar{g}(x)$, it is desired to locate the maxima and minima of $\bar{g}(x,y)$.

Figure 4C:
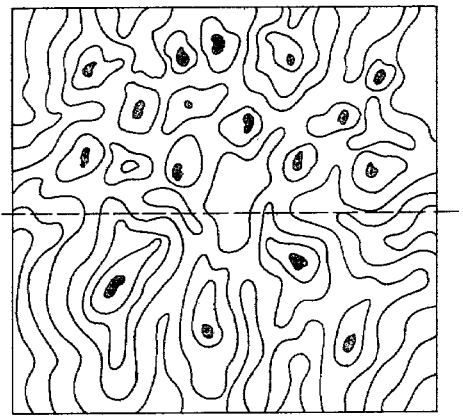
FIG. 4C illustrates the location of maxima and minima for the function $\bar{g}(x)$ as computed in accordance with the texture analysis technique of the present application.

FIG. 4C illustrates the location of maxima and minima for the function $\bar{g}(x,y)$. In FIG. 4C, contour lines have been drawn—as would typically be done in developing a topographical map—representing areas of constant $\bar{g}(x,y)$ values. The dark areas (corresponding to mountain tops in a topographical map) represent points of maxima $\bar{g}(x,y)$.

Further referring to FIG. 4C, it is to be noted that the upper half of the picture has a different texture from the lower half—that is, there are more "mountain peaks," or maxima per unit area, in the upper half of FIG. 4C than in the lower half thereof.

Once FIG. 4C is developed, graphs such as that of FIG. 3 can be plotted, wherein "neighborhood" area is now considered instead of "segment length." In that manner, textures corresponding to small "hills" on big "mountains" can be characterized. Of course, further characterization parameters for texture analysis can be computed in a similar fashion, as would be obvious to one of ordinary skill in the art.

The procedure just described has the effect of averaging or smoothing an original picture, the smoothing being performed repeatedly. For each smoothed picture, a spectrum of points is obtained in accordance with gray levels; that is, the picture is "partitioned" in accordance with gray levels. For each partition, four attributes are chosen—area, boundary length, width and proportion.

Further, in accordance with the texture analysis technique, the first moment (mean), second moment (variance), and third moment (skewness) are obtained for each attribute. Thus, a matrix of parameters is obtained for each smoothing cycle, the matrix being represented as follows:

$$[B_{ij}(s)]$$

where i=1 to 4 for the four attributes, which are functions of the gray levels j=1 to 3 for the three moments s=number of the smoothing cycle.

A similar matrix is obtained for the so-called difference picture—which is the result of point-by-point subtraction of an average picture from the original picture.

As mentioned earlier, the method and system for image processing of the present application achieves texture analysis in a rapid and economical manner. The key to the speed of the present method and system resides in the ability, in accordance with the present invention, to operate on an image or picture in its entirety, or as a whole. The inventive system of the present application is specially designed so as to be capable of executing instructions—corresponding to computation steps associated with the texture analysis technique—in a very short time (e.g., 33 milliseconds) for most texture-extracting instructions, operating on all of the points in the picture in the same manner.

For example, let l represent the gray-level value of a point on a picture, and let l (+1) represent the gray-level value of a point a distance i points to the right of point l. Then, a first operation is performed, forming l', where $$l' = \frac{l}{2} - \frac{l(+1)}{2} \quad (1)$$

that is, the points of the picture are added to the points of the picture displaced by one unit-spot distance to the right, and the result is divided by two. Let l'' represent the results after two operations, where $$l'' = \frac{l'}{2} - \frac{l'(+2)}{2} \quad (2)$$

$$\text{or } l'' = \frac{l}{4} - \frac{l(+1)}{4} - \frac{l(+2)}{4} - \frac{l(+3)}{4} \quad (3)$$

Here, the operation performed on the whole l' picture is the same as was originally performed on the l picture, except that the picture is displaced two unit spots to the right. Again, let l''' represent the result after three operations, where $$l''' = \frac{l''}{2} - \frac{l''(+4)}{2} \quad (4)$$

$$\text{or } l''' = \frac{l}{8} - \frac{l(+1)}{8} - \frac{l(+2)}{8} - \frac{l(+3)}{8} - \frac{l(+4)}{8} - \frac{l(+5)}{8} - \frac{l(+6)}{8} + \frac{l(+7)}{8} \quad (5)$$

Here, the picture is added to itself displaced four unit spots to the right, and then divided by two, and so forth. Next, the same operations—but with respect to the y-direction (as opposed to the x-direction)—are performed on l'''

In the example, after six whole picture operations, or 0.2 seconds, a picture will have been formed wherein each point of the picture represents the average of a square neighborhood of 64 points about each point of the original picture. For 2N such operations, neighborhoods of $2^{2 \cdot N}$ points for every point in the original picture are obtained. It is to be noted that it is not necessary to store the original picture, or any of the intermediate pictures, since in each instance only the neighborhood picture developed up to that step, and the picture displaced, are processed.

Figure 5:
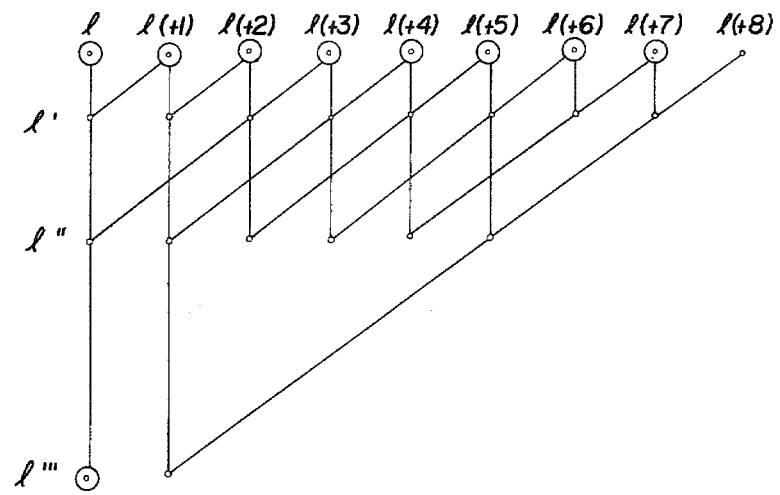
FIG. 5 is a diagram utilized to describe computation of the first, second and third moments in accordance with the texture analysis technique of the present application.

The above procedure is diagrammatically represented in FIG. 5. Reference letters l', l'' and l''' are located next to each of the points, in FIG. 5, corresponding to the results of processing in accordance with equations (1), (3) and (5), respectively.

Further referring to equations (1) through (5) above, it will be noted that the various mathematical procedures involved in the execution of each equation are rather standardized and repetitive in nature. As will be seen below, a unique feature of the presently disclosed system—and, in particular, a unique feature of the video processor therein—relates to the special design of the system (which is, preferably, implemented by the special-purpose texture computer controlled by a minicomputer) so as to provide for operation on the picture as a whole at high (TV scan) rates in accordance with single-instruction execution to accomplish the operations represented by equations (1) through (5) above. This feature will receive further treatment below.

FIG. 6 is a block diagram of the basic system for image processing of the present invention.

More specifically, FIG. 6 depicts an image processing system (or auxiliary computer, or texture analysis computer (TEXAC)) 10, which operates in conjunction with a main computer (not shown), the interface between the auxiliary computer 10 and the main computer (not shown) being provided by bus 12. For example, the main computer can be DEC PDP-11/34 which interfaces with the auxiliary computer 10 via the bus 12. The use of an auxiliary computer provides the system with the capability of considering all picture points as one "picture-word," and—once instructed by the host computer to perform an operation—the auxiliary computer operates on the whole picture independent of the main computer. It does this at a very high speed, taking (for example) 1/30th of a second (the standard TV rate). Moreover, the auxiliary computer can be specially tailored to execute uniquely designed instructions (provided by the main computer) so as to perform such operations as are represented by equations (1) through (5) discussed above in a very rapid and efficient manner. This will be further discussed below.

Basically, the image processing system 10 comprises a plurality of picture memories 14, 16 and 18, a special-purpose video processor 20 for interpreting computer commands and for channeling the flow of steps involved in the command, a video crossbar switch 22 for routing data from and to memory units 14, 16 and 18, various control registers 24, 26, 28, 30, 32, 34 and 36 (to be discussed in detail below), a line buffer unit 38, an X/YDEL buffer 40, a video camera (not shown) for providing an input video signal via analog-to-digital converter (ADC) 42, and various color and black-and-white monitor units (not shown) connected via digital-to-analog (DAC) converters 44, 46, 48, 50, 52 and 54. The system also includes a master timing control circuit 56 which provides synchronization, and which is connected to slave timing control units 58, 60 and 62 for controlling those units which, in turn, control associated memory units 14, 16 and 18, respectively.

In operation, input to the system 10 can be from a number of different types of scanners, such as television raster scan, flying spot scan, rotating drum scan, etc. (with appropriate timing). The picture to be scanned can be from an X-ray plate, a microscope slide, a 35 mm transparency, or a print.

The system 10 preferably employs a standard television camera (not shown). The camera operates in synchronization with the system 10, via master timing control 56 which generates sync and blanking signals for the camera video signal (as is the conventional technique) in accordance with EIA standards. The input raster associated with the video camera is, preferably, 2:1 interlaced; that is, a frame scan includes two field scans of 16.5 milliseconds each, with alternate horizontal lines comprising each field, as is the typical arrangement in standard TV cameras in order to obtain flicker-free operation. In addition, the video camera, preferably, has high spatial and gray-scale resolution, low noise, high bandwidth preamplifiers, aperture and gamma correction, white peak clipping, and black level clamping (D.C. restoration), adjustable aspect ratio, a blemishfree vidicon tube with flat response across the tube face, shading correction circuits, etc. Moreover, preferably, the camera mount provides isolation from low and high frequency vibrations.

Input to the system 10 can also be received from the main computer (not shown), via bus 12, data register 36, and line buffer unit 38.

The camera video signal input (an analog signal) is provided to ADC 42 for conversion to digital form. For successful evaluation of pictorial texture, a 32-level gray-scale discrimination operation is preferable. Accordingly, in the preferred embodiment, the video signal from the TV camera is digitized, in ADC 42, in accordance with the convention of six bits per pixel, that is, 64 gray levels. Thus, the ADC 42 is, preferably an analog-to-digital converting device involving 64 reference levels and comparators operating in parallel, so that conversion of pixel analog video information into six bits is completed before the next pixel is sampled at the desired video rate.

The digital output of ADC 42 is provided, via transfer gate 64, both to video crossbar switch 22 and, via DAC 54, to a black-and-white video monitor (not shown). This provides the system 10 with the capability of operator monitoring of the image or picture being scanned by the video camera.

Digital video crossbar switch 22, as the name implies, operates as a selector or router of signals from either the video camera interface (that is, ADC 42) or the picture memories 14, 16 and 18, to the high-speed video processor 20 or the line buffer unit 38. With reference to the line buffer unit 38, the system 10 thus has the capability of exchanging data between the memories 14, 16 and 18 and the main computer, via line buffer unit 38 (preferably, one line at a time) and data register 36.

The video crossbar switch 22 generally includes a collection of bus selectors and line selectors/deselectors (multiplexers/demultiplexers). As will be described in detail below, the video crossbar switch performs the functions, inter alia, of source memory selection and destination memory selection (with reference to memories 14, 16 and 18), as well as the routing of various inputs and outputs to and from, respectively, the video processor 20.

Memories 14, 16 and 18 can be any conventional high-speed refresh memory units. In the preferred embodiment, there are three such units for three "picture words," respectively. However, it is to be understood that more or less than three memory units could be provided. In addition, it is preferable that organization within each memory plane correspond to the raster. For example, assuming a raster size of 512 horizontal lines with 768 pixels or points per line, each pixel having six bits (64 gray levels), there is preferably one "plane" of memory per bit of gray-level digitization; six planes per memory, and a total of 18 planes. Thus, organization within a plane is the same as the raster, 768 points × 512 lines.

Each picture memory 14, 16 and 18 is, preferably, a CCD (charge-coupled device) memory with self-refreshing capability. The slave timing control 58, 60 and 62 associated with each memory 14, 16 and 18, respectively, continuously circulates points in each memory plane synchronously at high (TV scan) rates with appropriate intervals for horizontal and vertical retrace, just as in a TV camera or monitor. The slave timing controls 14, 16 and 18, and master timing control 56 will be further discussed below.

In the preferred embodiment, information is transferred to and from memory units 14, 16 and 18, respectively, in serial-parallel fashion—that is, the bits of each pixel are handled in parallel and the pixels are handled serially. Moreover, the operations of the memory units 14, 16 and 18 are repetitively performed until the entire (or pre-programmed segment of the) picture is processed. Thus, processing takes place in a very short amount of time (1/30th of a second), the time per element being 62.1 nanoseconds in accordance with the following preferred basic memory specifications:

| | |
|---|---|
| visible elements per scan | 768 |
| visible lines per scan | 512 |
| fields per frame | 2 |
| video channels | 3 |
| element rate/channel | $16.1 \times 10^6$/sec. |
| element dwell time | 62.1 ns |
| bits per element per channel | 6 |

As mentioned previously, the slave timing control units 58, 60 and 62 operate in conjunction with the memories 14, 16 and 18, respectively, so that the contents of the memories 14, 16 and 18 are continuously swept or scanned much like a television raster scan. This provides the system 10 with a further feature in that the contents of the memories 14, 16 and 18 may be constantly displayed on respective television monitors (not shown), the outputs of memories 14, 16 and 18 being provided, via respective transformation gates 66, 68 and 70 (respectively) and DAC 52, 50 and 48 (respectively), to corresponding monitors (not shown).

In accordance with a further feature of the present invention, memory unit 18 is provided with extra outputs (relative to those of memory units 14 and 16, respectively) for providing color display of the contents of memory 18. Specifically, memory 18 has, associated therewith, transformation gates 70, 72 and 74 which are connected, via corresponding DAC 48, 46 and 44 (respectively), to the "green", "blue", and "red" inputs (respectively) of a color monitor. Thus, DAC 48 serves the dual functions of providing an analog output to a single, black-and-white monitor, or providing a "green" signal output to the "green" input of a color monitor.

The outputs of memory units 14, 16 and 18, respectively, are also provided—via respective transformation gates 66, 68 and 70—to the video crossbar switch 22 which, as previously discussed, routes the memory outputs to either the video processor 20 or the line buffer unit 38.

Finally, the contents of memories 14, 16 and 18, respectively, can be optionally altered by enabling respective transformation units so as to accomplish, for example, image enhancement (as will be now discussed).

Each of the units 64, 66, 68, 70, 72 and 74 preferably consists of a 256×8 bits (expandable to 12 bit for color use) random access memory (RAM) unit. The aforementioned units can be loaded from the host computer through the data register 36 with a table of values in accordance with the transformation to be performed. Since each pixel has six bits, there is a one-to-one correspondence between the pixel value and one of the bytes of the transformation unit. Thus, the image data (pixels stored in memory units 14, 16 and 18) can—on read out—be transformed in value so as to achieve the function of image enhancement, or some other function for that matter. For example, if the pixel (gray level) value is 230, then the 230th byte of the transformation unit can optionally change that value to another. Each transformation unit, therefore, can be programmed to enhance the image, or to transform the image with a function stored (as a table) in the transformation unit ($y = x/2$, $y = 2x$, $y = x^2$, etc.). It is to be noted that the input from the video camera (not shown) can also be transformed, via transformation unit 64.

In the operation of system 10, video processor 20 functions as a specially structured arithmetic-logical unit (as will be described in more detail below) having a high-speed adder, comparators, shift registers, etc. Preferably, logical operations, arithmetic operations, and shifting operations are performed in that sequence of priority.

The instruction philosophy of the method and system of the present invention is to achieve system communication and control through instructions (e.g., move (MOV) instructions) from the host computer. That is to say, the system (auxiliary computer) 10 of the present application receives instructions (such as assembly-level instructions) from the main computer, determines the various phases within an instruction, and then channels the flow of operations through all the necessary steps, which are basically register-to-register moves or jumps.

Upon receipt of an instruction from the main computer, the video processor 20 (as will be described below in detail) defines the necessary operations to take place, and begins operation on the first pixel of the first line, the operation being repeated for all of the points of the picture. During that time corresponding to vertical retrace (return to the beginning point), the processor indicates completion of the operation, receives the next command from the main computer, and sets up all of the necessary steps for execution of that command. Thus, no time is lost in the acquisition and set up of the instructions for execution. Additionally, the main computer is free to generate the next instruction while the video processor 20 is operating on the entire frame.

Line buffer unit 38 is used for intermediate temporary storage of line data so as to preclude overlap between picture memory data flow and processor flow. Preferably, line buffer 38 is a conventional buffer for holding 768 pixels (one line) of image data. The contents of the line buffer 38 are available to the video processor, via video crossbar switch 22. In addition, as will be further discussed below, line buffer 38 receives data from and sends data to the main computer via unibus 12 and data register 36, and provides data to and receives data from video processor 20 via video crossbar switch 22.

The system 10 of the present application is provided with seven registers which are used to hold data received from the main computer via bus 12, and—in some cases—to hold data developed by the system 10 and intended for transmittal, via bus 12, to the main computer. In the preferred embodiment, the control registers include X-register (XR) 24, Y-register (YR) 26, counter register (CTR) 28, compare/constant register (CKR) 30, instruction register (IR) 32, control/status register (CSR) 34, and data register (DR) 36. The contents and operation of these registers will be discussed in more detail below.

The system 10 performs the above-described functions in accordance with a specially designed set of instructions provided by the main computer. The set of instructions consists of specific instructions that are necessary for the hardware of system 10 to manipulate the image or picture data. A preferred instruction for execution by the system 10 appears as follows:

| OP | A | B | C | DELX | DELY | FACTOR |
|---|---|---|---|---|---|---|
| 6 BITS | 2 BITS | 2 BITS | 2 BITS | 6 BITS | 6 BITS | 8 BITS |

OP: operation code, i.e., add, subtract, etc. There can be $2^6 = 64$ different instructions.

A,B,C: addresses of the picture memories. Initially, for 3 separate memories, values are restricted to 1, 2 and 3. A value of 0 means a "null" picture.

DELX,DELY: displacement along X-axis and Y-axis respectively; e.g., DELX=64 and DELY=0 means shift a picture (say in B) 64 points in the +X direction.

FACTOR: the multiplicative or divisive factor or a constant. For example, consider the following instruction:

| ADD | 3 | 3 | 2 | 1 | 0 | 2 |
|---|---|---|---|---|---|---|

This instruction will take the picture in memory 3, shift it 1 place to the right, add the two, divide the result by 2 and store the final result in memory 2. Other operations include arithmetic (+, −, etc.), logical (union, intersection, complement), and comparison (of two pictures, of a picture with a constant) operations. Examples of such operations are set forth in Appendix A at the end of this specification. Other special purpose operations would be evident to those of ordinary skill in the art of image processing—for example, gray-level spectrum, object count, range count, etc. Moreover, further operations which could be performed include control and channeling operations relating to the inputs and outputs of the auxiliary computer 10.

A majority of the instructions, preferably, use two's complement arithmetic with limit detection; some are duplicated with positive integer arithmetic with limit detection.

FIGS. 7A through 7D are detailed block diagrams of the various elements of the video crossbar switch and video processor of the system of the present invention.

Figure 7A:
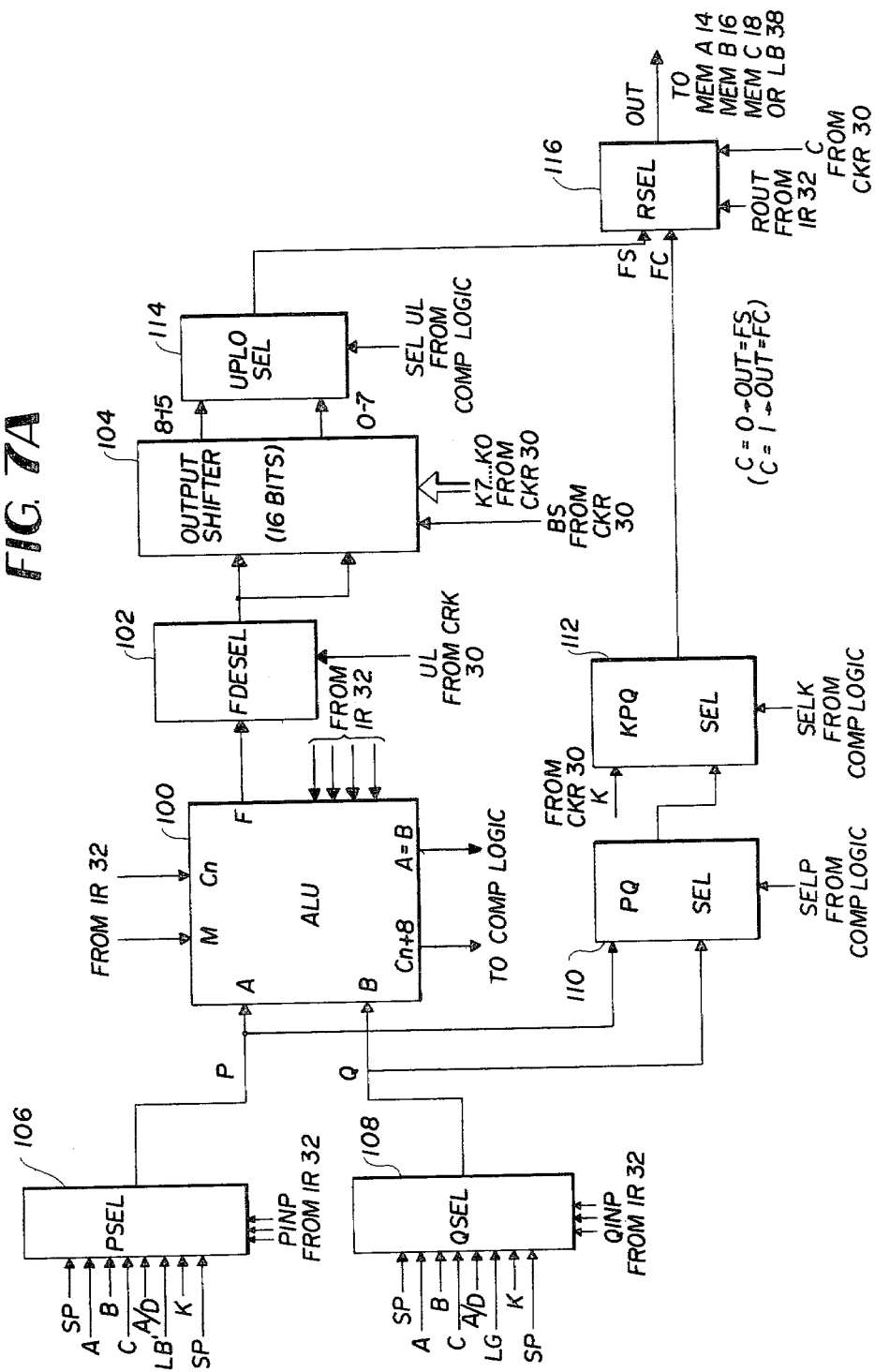

Referring to FIG. 7A, the video processor 20 (FIG. 6) includes arithmetic logic unit (ALU) 100, FDESEL selector 102, and output shifter circuit 104. As will be seen below, video processor 20 (FIG. 6) also includes comparison logic (COMP LOGIC) circuitry set forth in FIG. 7D.

Returning to FIG. 7A, ALU 100 has two inputs (A, B) which (as will be seen below) are connected to the video crossbar switch 22 (FIG. 6). As will also be seen below, each of the inputs A, B to ALU 100 can receive data from any one of memories 14, 16 and 18, line buffer unit 38, ADC 42, or CKR register 30. ALU 100 performs arithmetic and logical operations, as well as comparison operations, with respect to the two inputs, A, B. The operation to be performed by the ALU 100 is determined by six bits (defining an op code) of instruction register 32 (FIG. 6). These six bits are provided as inputs M, $C_n$, $S_3$, $S_2$, $S_1$ and $S_0$ to the ALU 100. The various arithmetic (no carry and carry), logical, and comparison operations which are performed by ALU 100—and the various op codes corresponding thereto—are set forth in Tables 1–7 appearing below. As can be seen from Tables 1–5, the various arithmetic and logical operations performed in response to the six-bit op code result in the generation of output F of ALU 100, the output F being provided to the FDESEL selector 102. Moreover, as can be seen from Tables 6–7, the various comparison operations which are performed by ALU 100 result in generation of logical "one" or "zero" conditions at the outputs $C_{n+8}$ and A=B, respectively, of ALU 100. The latter two outputs are provided to comparison logic circuitry to be discussed in further detail below with reference to FIG. 7D.

Further referring to FIG. 7A, the output F of ALU 100 is provided to a selector (FDESEL) 102 which, in accordance with an input UL from CKR register 30 (FIG. 6), multiplexes the output F of ALU 100 so as to operate on each byte as an entity in itself (as indicated by UL=0), or alternatively, to operate on 16 bits (as indicated by UL=1), that is, operate in the "no rotate shift" mode of operation.

The output of FDESEL selector 102 is provided to output shifter 104 which selectively, in response to input BS from CKR register 30 (FIG. 6), shifts the contents left or right by a given amount of shift. The nature of the shifting operation is controlled by inputs K7 ..., K0 from CKR register 30 (FIG. 6). This input from register 30 will be discussed in more detail below.

The two outputs, designated "0-7" and "8-15" in FIG. 7A, of output shifter 104 form the output of video processor 20 (FIG. 6), and are provided to the video crossbar switch 22.

FIG. 7A also discloses PSEL selector 106, QSEL selector 108, PQSEL selector 110, KPQSEL selector 112, UPLOSEL selector 114, and RSEL selector 116, the latter elements forming a portion of the video crossbar switch 22 (FIG. 6).

TABLE 1

| | | | | | | | Arithmetic, no carry | |
|---|---|---|---|---|---|---|---|---|
| Useful | M | $C_n$ | $S_3$ | $S_2$ | $S_1$ | $S_0$ | OCTA $L_8$ | ALU Output F |
| 00 | 0 | 0 | 0 | 0 | 0 | 0 | 00 | A |
| | 0 | 0 | 0 | 0 | 0 | 1 | 01 | A . OR . B |
| | 0 | 0 | 0 | 0 | 1 | 0 | 02 | A . OR . $\overline{B}$ |
| 03 | 0 | 0 | 0 | 0 | 1 | 1 | 03 | −1 ($377_8$) 2's complement |
| | 0 | 0 | 0 | 1 | 0 | 0 | 04 | A + (A . AND . $\overline{B}$) |
| | 0 | 0 | 0 | 1 | 0 | 1 | 05 | (A . OR . B) + (A . AND . $\overline{B}$) |
| 06 | 0 | 0 | 0 | 1 | 1 | 0 | 06 | A-B-1 |
| | 0 | 0 | 0 | 1 | 1 | 1 | 07 | (A . AND . $\overline{B}$) - 1 |
| | 0 | 0 | 1 | 0 | 0 | 0 | 10 | A + (A . AND . B) |
| 11 | 0 | 0 | 1 | 0 | 0 | 1 | 11 | A + B |
| | 0 | 0 | 1 | 0 | 1 | 0 | 12 | (A . OR . $\overline{B}$) + (A . AND . B) |
| | 0 | 0 | 1 | 0 | 1 | 1 | 13 | (A . AND . B) - 1 |
| 14 | 0 | 0 | 1 | 1 | 0 | 0 | 14 | A + A |
| | 0 | 0 | 1 | 1 | 0 | 1 | 15 | (A . OR . B) + A |
| | 0 | 0 | 1 | 1 | 1 | 0 | 16 | (A . OR . B) + A |
| 17 | 0 | 0 | 1 | 1 | 1 | 1 | 17 | A - 1 |

TABLE 2

| | | | | | | | Arithmetic, with carry | |
|---|---|---|---|---|---|---|---|---|
| Useful | M | $C_n$ | $S_3$ | $S_2$ | $S_1$ | $S_0$ | OCTA $L_8$ | ALU Output F |
| 20 | 0 | 1 | 0 | 0 | 0 | 0 | 20 | A + 1 |
| | 0 | 1 | 0 | 0 | 0 | 1 | 21 | (A . OR . B) + 1 |
| | 0 | 1 | 0 | 0 | 1 | 0 | 22 | (A . OR . $\overline{B}$) + 1 |
| 23 | 0 | 1 | 0 | 0 | 1 | 1 | 23 | 0 |
| | 0 | 1 | 0 | 1 | 0 | 0 | 24 | A + (A . AND . $\overline{B}$) + 1 |
| | 0 | 1 | 0 | 1 | 0 | 1 | 25 | (A . OR . B) + (A . AND . $\overline{B}$) + 1 |
| 26 | 0 | 1 | 0 | 1 | 1 | 0 | 26 | A - B |
| | 0 | 1 | 0 | 1 | 1 | 1 | 27 | A . AND . $\overline{B}$ |
| | 0 | 1 | 1 | 0 | 0 | 0 | 30 | A + (A . AND . B) + 1 |
| 31 | 0 | 1 | 1 | 0 | 0 | 1 | 31 | A + B + 1 |
| | 0 | 1 | 1 | 0 | 1 | 0 | 32 | (A . OR . $\overline{B}$) + (A . AND . B) + 1 |
| | 0 | 1 | 1 | 0 | 1 | 1 | 33 | A . AND . B |
| 34 | 0 | 1 | 1 | 1 | 0 | 0 | 34 | A + A + 1 |
| | 0 | 1 | 1 | 1 | 0 | 1 | 35 | (A . OR . B) + A + 1 |
| | 0 | 1 | 1 | 1 | 1 | 0 | 36 | (A . OR . B) + A + 1 |
| 37 | 0 | 1 | 1 | 1 | 1 | 1 | 37 | A |

TABLE 3

| Summary of Useful Arithmetic Opcodes | | | |
|---|---|---|---|
| F = A | 00 or 37 | F = 0 | 23 |
| F = A + A | 14 | F = $-1_8$ | 03 |
| F = A + B | 11 | F = A + B + 1 | 31 |
| F = A − B | 26 | F = A + A + 1 | 34 |
| F = A + 1 | 20 | F = A − B − 1 | 06 |
| F = A − 1 | 17 | | |

TABLE 4

Logical Operations ($C_n$ = don't care, 0 or 1)
All Useful

| A | $C_n$ | $S_3$ | $S_2$ | $S_1$ | $S_0$ | OPCODE$_8$ | ALU Output F |
|---|---|---|---|---|---|---|---|
| 40,60 | — | 0 | 0 | 0 | 0 | 40 | 60 | $\bar{A}$ |
| | — | 0 | 0 | 0 | 1 | 41 | 61 | $\overline{A \; OR \; B}$ (NOR) |
| | — | 0 | 0 | 1 | 0 | 42 | 62 | $\bar{A} \; AND \; B$ |
| 43,63 | — | 0 | 0 | 1 | 1 | 43 | 63 | 0 (all) |
| | — | 0 | 1 | 0 | 0 | 44 | 64 | $\overline{A \; AND \; B}$ (NAND) |
| 45,65 | — | 0 | 1 | 0 | 1 | 45 | 65 | $\bar{B}$ |
| 46,66 | — | 0 | 1 | 1 | 0 | 46 | 66 | A EXOR B |
| | — | 0 | 1 | 1 | 1 | 47 | 67 | A AND $\bar{B}$ |
| | — | 1 | 0 | 0 | 0 | 50 | 70 | $\bar{A} \; OR \; B$ |
| | — | 1 | 0 | 0 | 1 | 51 | 71 | $\overline{A \; EXOR \; B}$ |
| 52,72 | — | 1 | 0 | 1 | 0 | 52 | 72 | B |
| 53,73 | — | 1 | 0 | 1 | 1 | 53 | 73 | A AND B |
| 54,74 | — | 1 | 1 | 0 | 0 | 54 | 74 | 1 (all) |
| | — | 1 | 1 | 0 | 1 | 55 | 75 | A OR $\bar{B}$ |
| 56,76 | — | 1 | 1 | 1 | 0 | 56 | 76 | A OR B |
| 57,77 | — | 1 | 1 | 1 | 1 | 57 | 77 | A |

TABLE 5

Summary of Useful Logical Opcodes

| | | | |
|---|---|---|---|
| F = A | 57, 77 | F = A OR B | 56, 76 |
| F = B | 52, 72 | F = A EXOR B | 46, 76 |
| F = $\bar{A}$ | 40, 60 | F = all 0's | 43, 63 |
| F = $\bar{B}$ | 45, 65 | F = all 1's | 54, 74 |
| F = A AND B | 53, 73 | | |

TABLE 6

Comparison OPCODES

| | | | | | | | OUTPUTS | | | |
|---|---|---|---|---|---|---|---|---|---|---|
| M | $C_n$ | $S_3$ | $S_2$ | $S_1$ | $S_0$ | OCTAL$_8$ | FUNCTION | $C_{n+x}$ | $\overline{C_{n+x}}$ | A = B | $\overline{A = B}$ |
| 0 | 0 | 0 | 1 | 1 | 0 | 26 | A ≤ B | | | | |
| 0 | 1 | 0 | 1 | 1 | 0 | 26 | A > B | | | | |
| 0 | 0 | 0 | 0 | 1 | 0 | 06 | A < B | | | | |
| 0 | 1 | 0 | 0 | 1 | 0 | 06 | A ≥ B | | | | |
| 0 | 0 | 0 | 0/1 | 1 | 0 | 06,26 | A = B | | | 1 | |
| 0 | 0 | 0 | 0/1 | 1 | 0 | 06,26 | A ≠ B | | | | 1 |

TABLE 7

OPCODE List for Codes Used

| | |
|---|---|
| F = A | 70 |
| F = $\bar{A}$ | 04 |
| F = A + B | 11 |
| F = A − B | 26 |
| F = $\bar{A}$ | 40 |
| F = A AND B | 53 |
| F = A OR B | 56 |
| F = A EXOR B | 46 |
| F = ALL ZEROS | 43 |
| F = ALL ONES | 54 |
| A > B, $\overline{C_{n+x}}$ = 1 | 26 |
| A < B, $C_{n+x}$ = 1 | 06 |
| A = B, (A = B) = 1 | 06 |
| A ≠ B, $\overline{(A = B)}$ = 1 | 06 |

In operation, selectors 106 and 108 receive inputs PINP and QINP, respectively, from instruction register 32 (FIG. 6), and respond thereto by selecting one of six inputs for provision, as inputs P and Q, respectively, to ALU 100 of the video processor 20. More specifically, selectors 106 and 108 select one of six inputs identified as follows: A from memory 14, B from memory 16, C from memory 18, A/D from ADC 42, LB from line buffer 38, and K from CKR register 30 (all as shown in FIG. 6).

Selectors 106 and 108 also provide P and Q as inputs to PQSEL selector 110 which, in response to input SELP (from the comparison logic circuitry to be discussed below with reference to FIG. 7D)—that is, depending on the result of comparison tests, where the maximum or minimum of two inputs is to be selected, as performed in the video processor 20 (FIG. 6)—selects the input to be provided to further selector 112. KPQSEL selector 112 responds to input SELK from the comparison logic circuitry of FIG. 7D (to be discussed below)—that is, depending on whether the comparison is of the MAX/MIN select type, or requires writing a constant value—selects either the output of selector 110 or a K value provided by CKR register 30 (FIG. 6). Once selector 112 makes a selection between the output of selector 110 and the K value from CKR register 30, the selected data is provided, as output FC, to RSEL selector 116.

RSEL selector 116 responds to a C input from CKR register 30 (FIG. 6) so as to choose between output FC of selector 112 and a further output FS of selector 114, the selected data being provided, as OUT, to a selected destination memory, as indicated by ROUT provided by instruction register 32. That is to say, RSEL selector 116 selects either the output (FC) of selector 112 if the operation performed was a comparison operation, or the output FS of UPLOSEL selector 114 (an output shifter byte) if the operation was not a comparison operation.

UPLOSEL selector 114 is responsive to input SELUL from comparison logic circuitry (FIG. 7D, to be discussed below) so as to select the upper byte of output shifter 104 when the system is in a "bit shift" mode of operation.

Figure 7B:
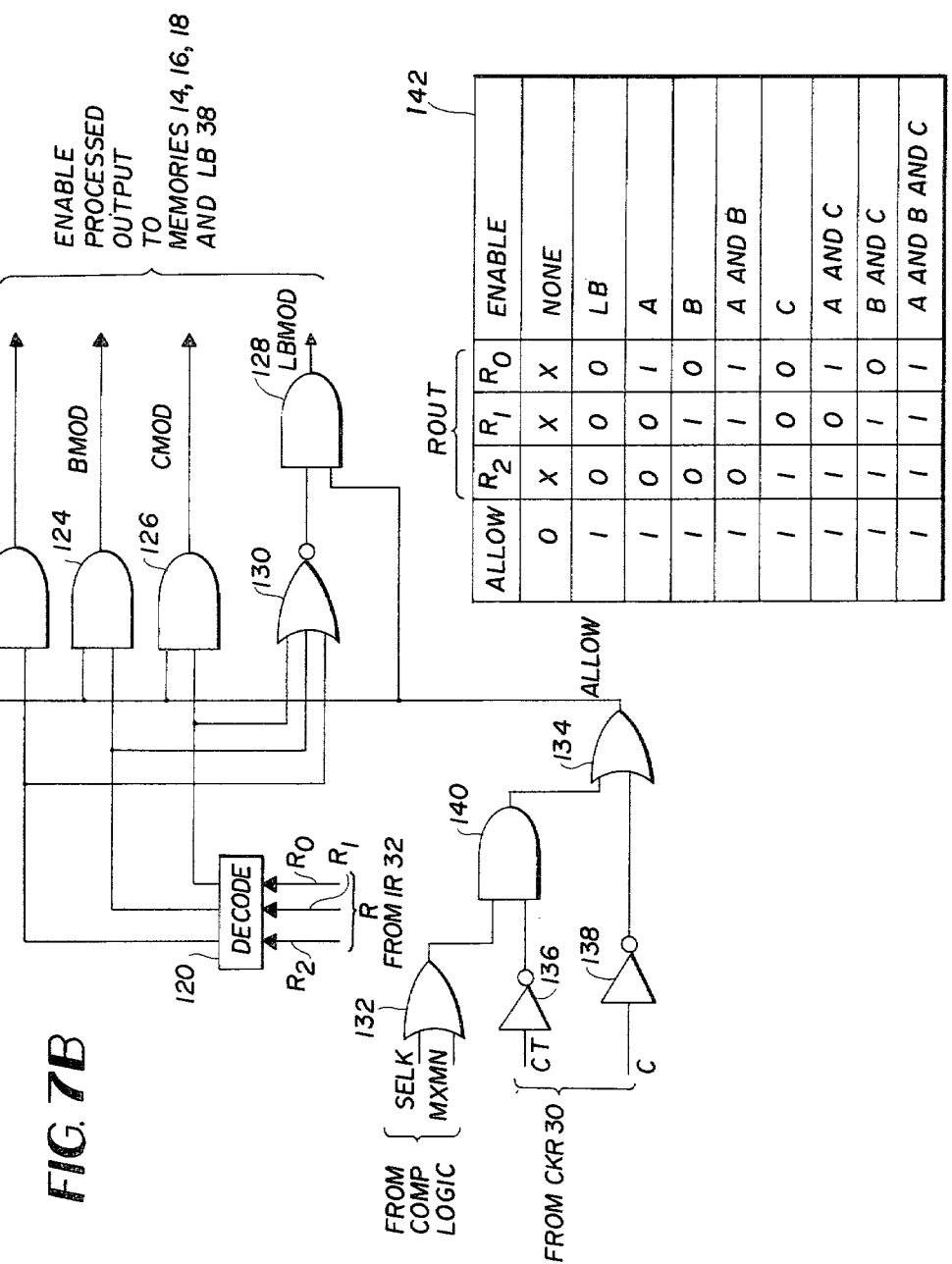

FIG. 7B further discloses the video crossbar switch 22 of FIG. 6. Specifically, this portion of the video crossbar switch 22 comprises, referring to FIG. 7B, decode circuitry 120, AND gates 122, 124, 126 and 128, and NOR gate 130—the latter elements performing the function of indicating the destination of the processed output of video processor 70 (FIG. 6)—that destination being selected from among memories 14, 16, 18 and line buffer unit 38 (FIG. 6).

Further referring to FIGS. 6 and 7B, video crossbar switch 22 further comprises OR gates 132 and 134, inverters 136 and 138, and AND gate 140. The latter elements logically process inputs SELK, MXMN (from comparison logic circuitry of FIG. 7D), as well as inputs CT and C from CKR register 30, so as to indicate—via output ALLOW of OR gate 134—whether or not the processed output of video processor 20 should be routed to any of memories 14, 16, 18 and line buffer unit 38.

The table 142 in FIG. 7B set forth the logical conditions (ALLOW and R2, R1 and R0) which determine whether or not the processed output of video processor 20 should be provided as an output, and—if such is determined—which of memories 14, 16, 18 and line buffer unit 38 to receive the processed output. The logic circuitry of FIG. 7B will be further discussed below in connection with the description of the comparison logic of FIG. 7D.

Figure 7C:
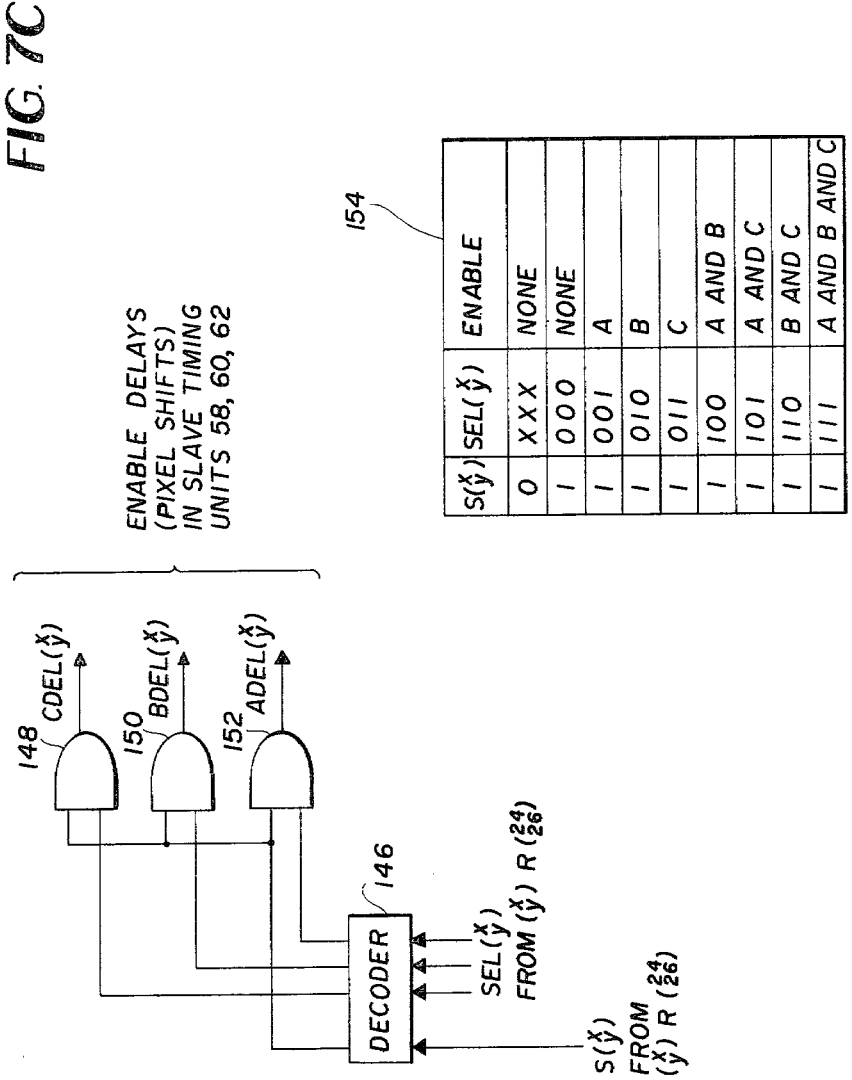

FIG. 7C sets forth further elements comprising the video crossbar switch 12 of FIG. 6. Specifically, the video crossbar switch 22 further comprises (referring to FIG. 7C) decoder 146 and AND gates 148, 150 and 152. The circuitry of FIG. 7C provides output ADEL (X, Y), BDEL (X, Y), and CDEL (X, Y) which enable delays—for the purpose of pixel shifting—to be accomplished in slave timing control units 58, 60 and 62, respectively (FIG. 6). It is to be noted that the notation, "(X, Y)," indicates that the circuitry of FIG. 7C is duplicated—one for X-shifting, and one for Y-shifting. Accordingly, the inputs S (X, Y) and SEL (X, Y) are in actuality separate inputs S (X) and S (Y), etc. from the X-register 24 and Y-register 26, respectively. In addition, separate outputs—ADEL (X), ADEL (Y), etc. would be generated by the duplication circuitry to control shifting in the X and Y directions, respectively.

In operation, the input S (X, Y) is received by decoder 146, and passed through as an enabling/non-enabling input of AND gates 148, 150 and 152. Accordingly, as indicated by the Table 154, delays are not enabled when S (X, Y)=0.

The decoder 146 also receives input SEL (X, Y) from the (X, Y) register (24, 26—FIG. 6), and provides individual bits of this three-bit input to AND gates 148, 150 and 152. In accordance with the table 154 in FIG. 7C, the identity of the three-bit input corresponds to those slave timing control units (58, 60 or 62—FIG. 6) which are to be enabled for delay (pixel shifting).

FIG. 7D is a logical block diagram of comparison logic circuitry 200 contained in the video processor 20 (FIG. 6). Referring to FIG. 7D, the comparison logic circuitry comprises comparison demultiplexer 202, inverters 204 and 206, AND gates 208 through 216, and OR gates 218 through 220. Reference will be made to the table 222 of FIG. 7D.

In operation, comparison demultiplexer 202 receives and processes the three-bit input COMP from CKR register 30, and—based on the identity of the three bits—indicates one of eight possible outputs which—as shown in the table 222—corresponds to a desired comparison. Specifically, "zero" indicates the comparison "P greater than Q", "one" indicates the comparison "P equal to or less than Q", etc.

Inverters 204 and 206 receive the indicated data from ALU 100 (FIG. 7A), and provide logically inverted representations thereof.

AND gates 208 through 213 test for the various comparison conditions (contained in the second column of Table 222, in correspondence to the demultiplexer outputs 0, 1 . . . , 7 in the first column of the table 222) by performing an AND operation with respect to the $C_{n+8}$ and A=B outputs of ALU 100 (FIG. 7A). When any of the comparison conditions is indicated by one of AND gates 208 through 213, OR gate 218 produces the output SELK, which is provided (as previously discussed) to the KPQSEL selector 112 (FIG. 7A). An output of SELK=1 indicates that the KPQSEL selector 112 should select the input data K derived from CKR register 30 (FIG. 6). Conversely, an output of SELK=0 indicates that the KPQSEL selector 112 should select the output of PQSEL selector 110 (FIG. 7A).

Further referring to FIG. 7D, AND gates 214 and 215 perform a check for comparison conditions MAX (P, Q) and MIN (P, Q)—corresponding to multiplexer 202 outputs "6" and "7", respectively. Upon detection of either condition, OR gate 220 provides output SELP to PQSEL selector 110 (FIG. 7A). An output of SELP=1 causes PQSEL selector 110 to select the P output of PSEL selector 106. Conversely, an output of SELP=0 causes the PQSEL selector 110 to choose the Q output of QSEL selector 108.

In addition, the detection, by OR gate 219, of either "6" or "7" outputs of demultiplexer 202 (FIG. 7D) results in an output MXMN being provided to OR gate 132 (FIG. 7B).

Referring back to FIG. 7B—and, in particular, to that circuitry (elements 132, 134, 136, 138, 140) for generating the output ALLOW—it is to be noted that the OR gate 132 receives both SELK and MXMN from OR gates 218 and 219, respectively, in FIG. 7D. Thus, the output ALLOW is generated by OR gate 134 (FIG. 7B) when either SELK or MXMN is detected by OR gate 132, provided that AND gate 140 is enabled by $\overline{CT}$ from CKR register 30 (FIG. 6)—$\overline{CT}$ indicating that the system is not in the "count" mode. In addition, ALLOW is generated by OR gate 134 when C=0, as indicated by CKR register 30 (FIG. 6), C=0 indicating that the system is in the "constant" mode of operation.

Returning to FIG. 7D, AND gate 216 generates output SELUL upon simultaneous occurrence of U and BS from CKR register 30 (FIG. 6), U indicating desired selection of the upper byte of output shifter 104 by UPLOSEL selector 114 (FIG. 7A). Thus, SELUL is generated to cause selection, in the UPLO selector 114 (FIG. 7A), of the upper byte of the output of output shifter 104, provided that the system is in the "bit shift" mode of operation, as indicated by BS=1.

Figure 8A:
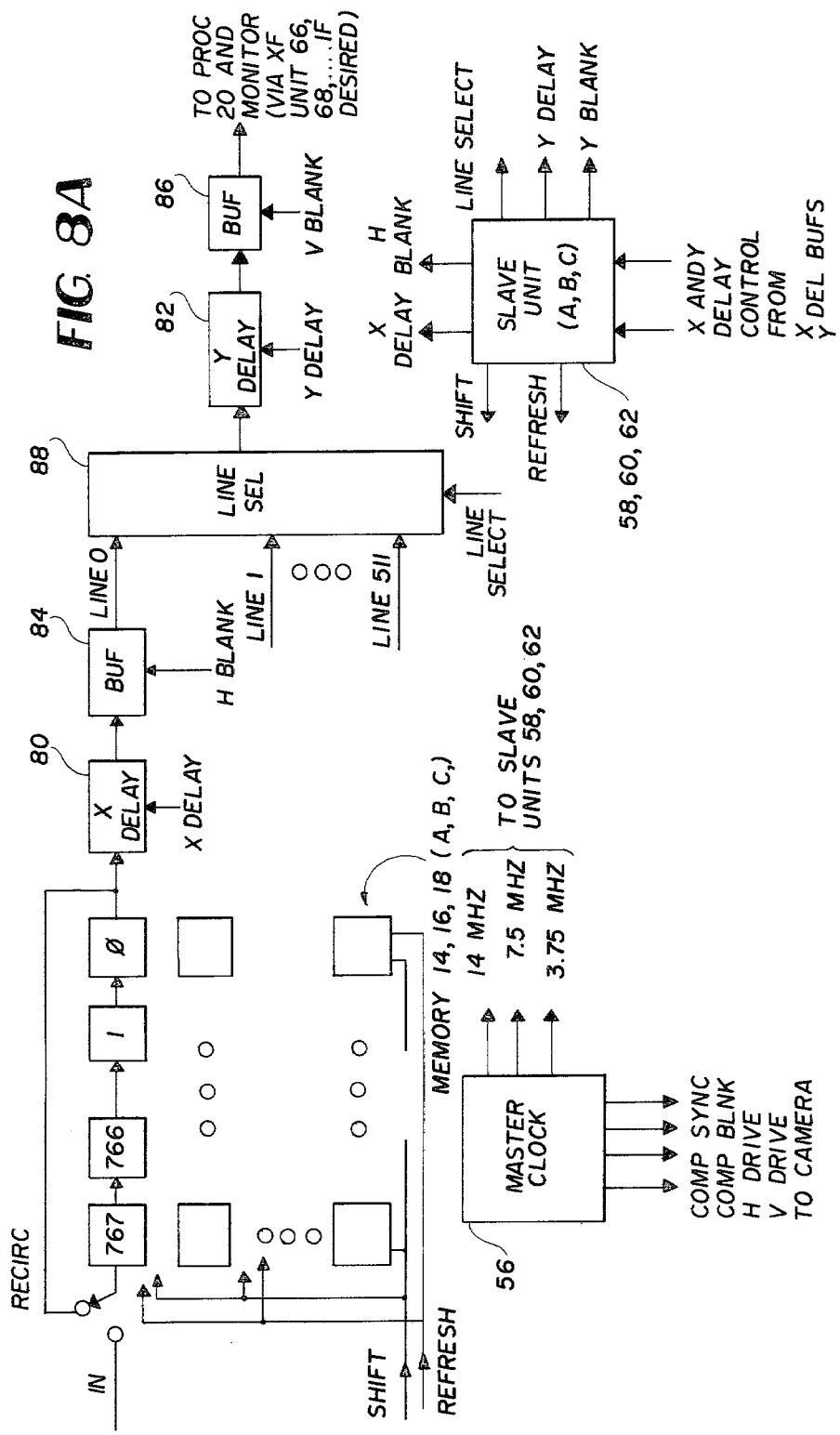
FIG. 8A is a block diagram of the master timing control unit and slave timing control units of the system of the present invention.

FIG. 8A is a block diagram of the master timing control unit 56, slave timing control units 58, 60, 62, and refresh memories 14, 16, 18 of the system of the present invention. As seen, the master timing control unit comprises a multi-phase control clock that provides sync, blanking, horizontal drive and vertical drive signals to the video camera, and as well provides 1.4 MHz, 3.75 MHz, 7.5 MHz clock signals to the slave timing control units 58, 60, 62.

The slave timing control units 58, 60 and 62 perform the following functions: (1) issuance of a shift pulse train to the various elements of the memories 14, 16 and 18, respectively, for the purpose of synchronizing the shifting of data into the memories 14, 16, 18; (2) the issuance of a refresh pulse to the memories 14, 16 and 18, respectively, when those memories are not in the "shift" mode; (3) issuance of x-delay (and y-delay) and H-blank (and V-blank) signals to the output circuitry (x-delay 80, y-delay 82, and buffers 84 and 86) of the memories 14, 16 and 18, respectively.

More specifically, with respect to function (3), the shows a case of a +1 pixel shift of line B with respect to line A. Finally, diagram 94 shows a case of a −1 pixel shift of line B with respect to line A.

Figure 9:
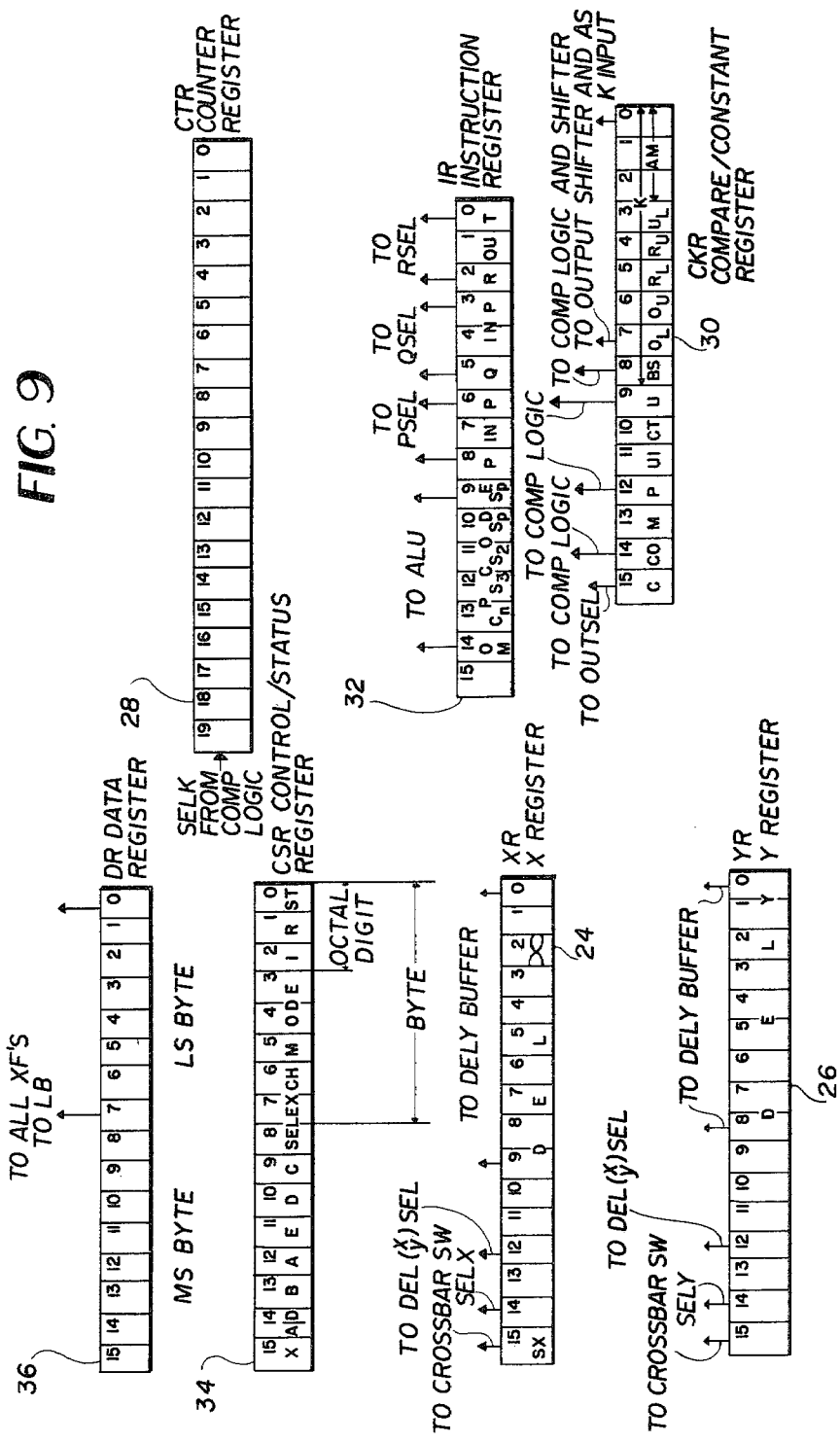
FIG. 9 is a diagrammatic representation of the various control registers of the system of the present invention.

FIG. 9 is a diagrammatic representation of the various control registers of the system of the present invention.

Data register (DR) 36 is a 16-bit register utilized to transfer data between the main computer, via bus 12 (FIG. 6), and line buffer unit 38, as well as to transfer data to the various transformation units 64, 66, 68, 70, 72 and 74.

Control/status register (CSR) 34 (FIG. 9) is a 16-bit register utilized to control various functions of the system 10 (FIG. 6), as well as to record the status (modes) of the system 10. The identity and function of the various bits of CSR 34 are set forth in Table 8 below.

TABLE 8

CONTROL/STATUS REGISTER: CSR

| | | |
|---|---|---|
| BIT 0: | ST: | Starts an operation when set |
| BIT 1: | I: | If set with ST, at completion of an operation vectored interrupt occurs (at location 240$_8$). |
| BIT 2: | R: | At the start of an operation this Ready Bit is reset. It is set at completion of the operation. |
| BITS 3–5: | MODE: | Selects the mode of operation |
| Mode | | Operation |
| 0 | | Clear LB validity bits |
| 1 | | Operate on a line indicated by YR |
| 2 | | Operate on entire memories or units |
| 3 | | Copy memory (A or B or C) to LB |
| 4–7 | | — |
| BITS 6–8: | SEL EXCH: | Determines which memory or unit is selected for exchange of data |
| SEL EXCH | | Selection |
| 0 | | No exchange |
| 1 | | A |
| 2 | | B |
| 3 | | C |
| 4 | | A/D |
| 5 | | LB |
| 6 | | D |
| 7 | | E |
| BITS 9–14: | C,D,E,A,B,A/D: SEL XE: Each bit is a switch to select or deselect corresponding transformation unit on outputs | |
| BIT 9: | C: XFC | (0 → deselect, 1 → select) |
| BIT 10: | D: XFD | |
| BIT 11: | E: XFE | |
| BIT 12: | A: XFA | |
| BIT 13: | B: XFB | |
| BIT 14: | A/D: XFA/D | |
| BIT 15: | X: X = 0 → XF on output only, X = 1 → XF on input and output | | slave timing control units 58, 60, 62 receive X-DEL and Y-DEL control signals from the X-register 24 (FIG. 6) and Y-register 26, respectively, via the (X, Y) DEL buffer 40, and are responsive thereto for issuing x-delay and y-delay outputs to the x-delay circuit 80 (FIG. 8A) and y-delay circuit 82, respectively. Thus, the output of memories 14, 16, 18 is appropriately delayed with respect to the x-direction, and—after buffering—provided to line selector circuit 88 which (in response to a LINE SELECT signal from slave units 58, 60, 62) selects consecutive lines 0, ..., 511. Then, selected line outputs are delayed with respect to the y-direction in y-delay circuit 82, and—after buffering—provided to video processor 20 (FIG. 6) and monitors (via XF units 66, 68, ..., subject to transformation if desired).

FIG. 8B is a timing diagram relating to the above-described operation of the master timing control unit 56, slave timing control units 58, 60 and 62, memories 14, 16, 18, and associated circuitry.

In FIG. 8B, timing diagram 90 shows a case of no shift of line B (first line) of memories 14, 16 or 18 with respect to line A (second line) thereof. Diagram 92

X-register (XR) 24 (FIG. 9) is used as an X-directional picture shifter, or as a Pixel Pointer Register when exchange between the main computer and the system 10 (FIG. 6) is to take place. Identities of the various bits of XR 24 are set forth in Table 9 below.

Y-register (YR) 25 (FIG. 9) is used as a Y-directional picture shifter, or as a Line Pointer Register when exchange between the main computer and the system 10 (FIG. 6) is to take place. The identities of the various bits of YR 26 are the same as set forth (in Table 9) for XR 24 with the following exception. In the Pointer mode, DELY indicates the byte address in a line (0 to 511.). In the Shifter mode, DELY indicates the amount of picture shift in the Y direction.

Counter (CTR) register 28 (FIG. 9) counts occurrences of SELK=1 as produced by the comparison logic of FIG. 7D, indicating that a "true" comparison has occurred. CTR 28 (FIG. 9) is reset by any "write" operation commanded by the main computer. CTR 28 is a 20-bit register.

Instruction register (IR) 32 (FIG. 9) is a 16-bit register for receiving, storing, and providing to the system 10 (FIG. 6) various instructions received from the main computer, via unibus 12. Basically, IR 32 stores an op code (bits 9-14), PINP and QINP (also called P and Q, respectively, and previously discussed above), and ROUT (also called R, and also discussed above). A detailed description of the data stored in the latter portions of the IR 32 has already been set forth above, and is summarized in Table 10 below.

Compare/constant register (CKR) 30 (FIG. 9) is used in conjunction with the comparison mode, constant mode, and bit shift mode of operation of system 10 (FIG. 6). CKR 30 has also been described to some extent above.

the various operational examples set forth in Appendix A.

It is to be noted that the system 10 (FIG. 6) is to be controlled by a main computer (not shown). Specifically, initialization of the system 10 and mode definition are carried out in conjunction with a sequence of activities initiated by the main computer. For example, in the preferred embodiment, such activities take place as set forth in Appendix B.

The above-described method and system for image processing can be used to implement various procedures, including such whole picture manipulations as enhancement of the edges of objects, discrimination of objects, texture synthesis, elimination of noise, determination of picture properties, and enlargement or con-

TABLE 9

X REGISTER: XR
This register is used as an X-directional picture shifter, or as a
Pixel Pointer Register when exchange between 11T34 CPU and TEXAC is to take place.

| | | |
|---|---|---|
| BIT 15: | SX: | 0 → Pointer mode |
| | | 1 → Shifter mode |
| BITS 0-9: | DELX: | In Pointer mode, indicates the byte address in a line (0 to 767 decimal). In Shifter mode, indicates the amount of picture shift in X direction. |
| BITS 12-14: | SELX: | These bits determine which memory should be used. |

| SELX | MEMORY |
|---|---|
| 000 | None |
| 001 | A |
| 010 | B |
| 011 | A and B |
| 100 | C |
| 101 | A and C |
| 110 | B and C |
| 111 | A and B and C |

TABLE 10

INSTRUCTION REGISTER: IR: BASE + 52

| | |
|---|---|
| BIT 15: | Unused |
| Bits 9-14: | OPCODE. The operation codes are defined in the following tables. |
| BIT 14: | M = 0 Arithmetic operations  A/U BIT |
| | M = 1 Logical operations |
| BIT 13: | Carry BIT $C_n$ = 0 no carry |
| | $C_n$ = 1 with carry |
| BITS 9-12: | ALU opcode: $S_0S_1S_2S_3$ |
| BITS 6-8: | PINP: Selects 1 of 8 inputs to A of ALU from source memories or LB or A/D |
| BITS 3-5: | QINP: Same as above for B of ALU |

| PINP or QINP (also called P or Q) | | Source Selected |
|---|---|---|
| 0 0 0 | 0 | |
| 0 0 1 | 1 | MEM A |
| 0 1 0 | 2 | MEM B |
| 0 1 1 | 3 | MEM C |
| 1 0 0 | 4 | A/D |
| 1 0 1 | 5 | LB |
| 1 1 0 | 6 | K |
| 1 1 1 | 7 | spare |

BITS 0-2: ROUT (also called R): selects 1 of 4 destination memories (A,B,C or LB) in conjunction with comparison test results

| ROUT or R | Destination Selected |
|---|---|
| 0 0 0 | LB |
| 0 0 1 | A |
| 0 1 0 | B |
| 0 1 1 | C |
| 1 0 0 | A and B |
| 1 0 1 | A and C |
| 1 1 0 | B and C |
| 1 1 1 | A and B and C |

A further description of the data stored in various portions of CKR 30 is set forth in Table 11 below.

Further details as to the operation/use of the abovedescribed registers can be obtained by referring to traction of objects. Such procedures generate whole picture results in a fraction of a second, whereas it would take an enormous amount of time to perform similar operations using a conventional computer system.

The following is an example of one of the many potential applications of the method and system of the present application. As is well known in the medical profession, chest X-rays can be used to aid in the diagnosis of pneumoconiosis, tumors, etc. For the illustration of texture applications, consider pneumoconiosis as a specific example. In such a case, the goal is to classify a chest X-ray film automatically according to the UICC/Cincinnati Standard Films. The latter is a set of X-rays showing specific examples as "standards" for the classification of the severity of pneumoconiosis.

TABLE 11

COMPARE/CONSTANT REGISTER: CKR: BASE + 44
This register is used in three modes, selected by BIT 15 and BIT 8.
    BIT 15: C. C = 1 comparison mode
              C = 0 constant mode
BIT 8: BS: BS = 0    no bit shift, BS = 1 bit shift mode
In constant mode, BITS
0-7 = K are used as the
K INPUT to the P & Q
selectors,
and all other bits are not
functional.
In Bit Shift mode, bits
of the OUTPUT
SHIFTER are shifted
left or right,
with rotate bit option
and overflow detection
option as follows:
BITS 0-2:   Amount AMT of shift
AMT      Result
0          Left 1
1          Left 2
2          Left 3
3          NONE
4          Right 1
5          Right 2
6          Right 3
7          Right 4
BIT 3: UL            0 - operate on each byte as entity
                        1 - operate on 16 bits (no Rotate Shift mode)
BIT 4: $R_u$            0 - shifted bits are lost
                        1 - Bit 15 rotated to Bit 8 for left shift, reverse for
                            right shift
BIT 5: $R_L$            0 - shifted bits are lost
                        1 - Bit 7 rotated to Bit 0 for left shift, reverse for
                            right shift
BIT 6: $O_u$            no overflow detect (for upper byte)
                          detect overflow (left shift of a bit out) of upper
                          byte and set all bits (to 1)
BIT 7: $O_L$           same as above for lower byte
BIT 9: U             select "upper" bit. When 0, selects lower byte of
                          Output Shifter as FS input to OUTSEL; selects upper
                          byte when 1.
In comparison mode, BITS 0-7 are used as K INPUT, as in constant mode.
BS and U must be zero. However, BITS 12-14 are now functional.
BIT 10: COUNT       Count mode
                          otherwise
BIT 11: UI             select F to Upper byte of shifter
BITS 12-14: COMP
COMP   Comparison
0         P > Q
1         P ≦ Q
2         P < Q
3         P ≧ Q
4         P = Q
5         P ≠ Q
6         MAX [P,Q]
7         MIN [P,Q]
Examples
BIT SHIFT Mode:
C = 0, COMP = 0, CT = 0, U = 0 to 1, $BSO_LO_U$ = 4 to 7, $R_LR_UUL$ = 0 to 7, AMT = 0 to 7

| | 1 | 1 | 11 | 11 | 11 |
|---|---|---|---|---|---|
| Image of CKR | 0 | 0 | 4 | 0 | 0 |
| | | | to | to | to |
| | | | 7 | 7 | 7 | i.e. CKR = 000400₈ to 001777₈ means a BIT SHIFT MODE.
Count Mode: CT = 1 disallows writing on outputs
Comparison Mode:
C = 1, COMP = 0 to 7, U = 0, BS = 0 and BITS 6-7 = 0 to 3, BITS 3-5 = 0 to 7.

TABLE 11-continued

BITS 0–2 = 0 to 7.

Image of CKR:   | 1 | 11 0 to 7 | 11 0 | 11 0 to 3 | 11 0 to 7 | 11 0 to 7 | i.e. CKR = 100000 to 170377 means Comparison Mode where K can be 000 to 377
(0 to 255 decimal)

Constant Mode:
_____
C = 0, COMP = 0, U = 0, BS = 0 and BITS 6–7 = 0 to 3, BITS 3–5 = 0 to 7, BITS 0–2 = 0 to 7

Image of CKR    | 11 0 | 11 0 | 11 0 | 11 0 to 3 | 11 0 to 7 | 11 0 to 7 | i.e. CKR = K = 000000 to 000377 where K = 000 to 377

The above-described method and system for automatically processing image data conceptually follows that taken by a radiologist in his evaluation of chest films. Thus, in accordance with the usual procedure of a radiologist, the various anatomic features, regions, and parts of the lung and rib cage (and heart) are recognized, and the type and extent of opacities in each of the regions of importance is characterized by means of texture analysis. The usual method is, first, to develop 25 parameter functions for each of the standard X-ray plates. Then, for a particular patient, the 25 parameter functions are compared with those of the standards, and the diagnosis corresponds to that standard which most closely matches the 25-parameter vector-function of the patient.

FIGS. 10A through 10H depict the first moment curves of the original and difference pictures for the parameters of area, contour, width and elongatedness of two X-rays of different severities of pneumoconiosis. Similar curves have been obtained for the second and third moments, and as well a curve for the number of cut-off objects has been obtained.

The above is one example of the many potential applications of the method and system of the present application which is specially suited to solve such problems in biomedical pattern recognition in a rapid and economical manner. In accordance with the above-described method and system, curves such as the first moment curves of FIGS. 10A through 10H can be computed and displayed in a rapid and economical manner. Moreover, use of refresh memories 14, 16 and 18 (FIG. 6), in conjunction with slave timing control units 58, 60 and 62, enable such displays to be made continuously with updating in a rapid, efficient manner.

The system 10—with its plurality of picture memories 14, 16 and 18—lends itself readily to color scanning. This has obvious biomedical uses since pathologists recognize the significance of color in the analysis of cytologic specimens. Whereas the analysis of this color data presently is done only in a qualitative way, the system 10 (as described above) can analyze data quantitatively and rapidly. Based on the above-described method and system, advantage can be taken of the unique high-speed scanning capabilities so that each field can be scanned three times, once for each basic color, using computer-controlled color wheels. This has the advantage of not reducing light intensity, especially when using a 100x microscope objective. Furthermore, by using a single picture tube, artifacts—which are created by the differences in vidicon tubes (i.e., shading, pincushioning, blemishes, etc.)—can be eliminated. Again, the use of three separate picture memories in the system 10 for the purpose of storing the same picture through the three different filters of the color wheel is an advantage. Moreover, it is relatively simple to control the positioning of the color wheel through the use of a stepping motor, and to expand the capabilities of the wheel by adding selective narrow band filters.

Finally, it is to be noted that the method and system of the present application can be utilized for more than a few applications. Besides being used in the treatment of the above-described conditions (pneumoconiosis, tumors, etc.), the system 10 of the present application can be utilized—in accordance with the appropriate procedures or algorithms—to analyze muscle fibers and blood cells, or—for that matter—various other non-medical pattern recognition projects.

While preferred forms and arrangements have been shown above in illustrating the present invention, it is to be clearly understood that various changes in detail and arrangement may be made without departing from the spirit and scope of this disclosure.

EXAMPLES
(Octal Notation for Register Contents)

CAMERA TO MEM
PLUS
DOUBLE
ADD CONSTANT
AND
K GREATER THAN
COUNT K =
MAX COMPARE
BINARY MULTIPLY
SHIFT PICTURE
DIVIDE WITH XF
MEM TO CPU
CPU TO MEM

Appendix A

Example 1: CAMERA VIDEO TO MEM
This is a NORMAL mode instruction. Therefore, INITIALIZE (if necessary).
Suppose the picture from camera is to be stored in MEMA.
Therefore, in IR:  OPCODE = (F=A) = 00
                P = A/D = 5
                Q = Don't Care = 0
                R = A = 1
This is a Whole Picture Operation.
Therefore, in CSR:  MODE = 2
                ST = 1
                R=0, and I=0 since vectored interrupt not chosen)
                ALL other bits = 0
CPYCAM:  MOV #501,  @BASE+52    (IR)
            MOV #20,   @BASE+26    (CSR)
Note:  At the end of the previous operation, the R bit is set, and
      vertical retrace begins. During the retrace, appropriate registers
      are changed by MOV instructions. At the completion of the retrace,
      the ST bit in CSR is checked and if it is set, then that operation
      is effected.
Note:  To copy camera picture to A, B and C, set up the following:
      MOV #507,  @BASE+52
      MOV #20,   @BASE+26
Example 2: PLUS
Add two pictures and store result in a MEM.
Suppose the pictures to be added are in MEMA and MEMB and the result
is to appear on MEMC.
IR:  OPCODE (F=A+B) = 11
     P = A = 1
     Q = B = 2
     R = C = 3
PLUS:  MOV #11123,  @BASE+52
       MOV #20,     @BASE+26
Example 3: DOUBLE
Add pic to itself and store in same MEM (double the pic).
IR:  OPCODE = (F=A+A) = 14
     P = A = 1
     Q = Don't Care = 0
     R = A = 1
DOUBLE:  MOV #14101,  @BASE+52
         MOV #20,     @BASE+26
Example 4: ADD CONSTANT
Add a constant to a pic (offset).
CKR:  K of CKR now should be the value of the constant, say $25_{10}$
      i.e. $31_8$
IR:  OPCODE = (F=A+B) = 11
     P = C = 3
     Q = K = 6
PLUSK:  MOV #31,    @BASE+44
        MOV #1136,  @BASE+52
        MOV #20,    @BASE+26
Example 5: AND
"AND" two pics
(B . AND . C→A)
IR:  OPCODE = (F = A.AND.B) = 53
     P = B = 2
     Q = C = 3
     R = A = 1

AND:  MOV #53231,  @BASE+52
      MOV #20,     @BASE+26
Example 6: K GREATER THAN
i.e.  If P>Q then R=K, else R=R
i.e.  Write a constant value in R for all points in P that are greater than
     the corresponding points in Q.
CKR:  K = say $255_{10}$ = $377_8$
      C = 1 for comparison mode
      COMP = 0 (for K> test)
IR:  OPCODE = (A>B) = 26
     P = A = 1
     Q = B = 2
     R = C = 3
KGT:  MOV #100377,  @BASE+44
      MOV #26123,   @BASE+52
      MOV #20,      @BASE+26
Note:
      If A>B, $C_{n+8}$ = 0, i.e. $\overline{C_{n+8}}$ = 1, therefore SELK = 1
      SEL UL=0 because U, BS=0), SELP=0
      Therefore KPQ SEL inputs are K or P, and SELK = 1 selects K for its output.
      At RSEL, ALLOW = 1, therefore K is selected to go to R = 3 = C.

-continued

If $A \leq B$, $C_{n+8} = 1$, $\overline{C_{n+8}} = 0$ and SELK=0. Therefore P is selected as the KPQ SEL output. However, at R SEL, ALLOW=0 and no output is selected, thus R(MEMC in this case) remains unchanged.

Example 7: COUNT K = (Count Equal)

i.e. Count the number of pixels in a picture that are of a given gray level value.

CKR:     K = gray level value say $64_{10}$ = $100_8$
         C=1 for comparison
         COMP=4 for K = test IR:      OPCODE = (A=B) = 06
         P = B = 2
         Q = K = 6
         R = Don't Care = 0

NEQ:    Clear the Counter with a WRITE operation.
         MOV #140100,    @BASE+44
         MOV #6260,       @BASE+52
         MOV #20,          @BASE+26

Note:    For pixel value 64, (A=B) from ALU =1 and SELK=1 otherwise SELK=0. The counter will count each SELK.
         At R SEL, ALLOW=0 because CT=1 and C=1

Note:    Clear the Counter:

.
.
.

,        Send Counter contents to CPU through DR

.
.
.

Example 8: MAX COMPARE i.e.     If P>Q, R=P, else R=Q
i.e.     The resultant picture has maximum value pixels from P and Q.
CKR:   K not required, and BS=0 → LS digits = 000
        C=1 for comparison test
        COMP=6 for MAX [P,Q] test
        CT=0, U=0

IR:      OPCODE = (A>B) = 26
        P = A = 1
        Q = B = 2
        R = C = 3

MAX:    MOV #160000,    @BASE+44
        MOV #26123,     @BASE+52
        MOV #20,         @BASE+26

Note:
When A>B, $C_{n+8}$=0, $\overline{C_{n+8}}$=1, so SELP=1, and SELK=0.
Therefore, FC=P and selects P=A at OUT, RSEL selects CMOD, and A is written out on C.

If $A \leq B$, $C_{n+8}$=1, $\overline{C_{n+8}}$=0, so SELP=0, and SELK=0.
Therefore, FC=Q and MXMN=1 sets ALLOW. Therefore, B is written out on C.

Example 9: BINARY MULTIPLY i.e.     Multiply a picture by 1 or 2 or 4 or 8 or 16.
i.e.     BIT SHIFT operation
CKR:   C=0, not comparison mode
        COMP=0 (which means K> test as far as SELK and SELP are concerned)
        CT=0, not count mode
        U=0 or 1 depending on which part of the multiplication is desired to be output
        BS=1 for bit shift mode
        K=2 place left shift of lower byte which is the picture byte to be multiplied Assume we want to multiply by $2^8$ ($256_{10}$). This requires 8 left shifts (not rotated) on all 16 bits (UL=1) of Output Shifter. Maximum left shift is 3. Therefore 3 shifts are required: 3 + 3 + 2.

i.e.     AMT = 3,3,2
$R_U$, $R_L$ and $O_U$, $O_L$ = 0
i.e.     CKR becomes, in turn, $00\binom{0}{1}413$, $00\binom{0}{1}413$, $00\binom{0}{1}412$
IR:      OPCODE = (F=A) = 00
        P = A = 1
        Q = Don't Care = 0
        R = A until bit shift is complete, then
        R = B for lower byte = 2
           = C for upper byte = 3

BM:     MOV #000413,     @BASE+44    3 left shifts in 16-bit shifter
        MOV #101,         @BASE+52    A pic to shifter, shifted pic back to A
        MOV #20,           @BASE+26
        TEST READY BIT
        MOV #000413,     @BASE+44
        MOV #101,         @BASE+52

-continued

|  | MOV #20, | @BASE+26 | Three more bits are shifted |
|---|---|---|---|
|  | TEST READY BIT | | |
|  | MOV #000412, | @BASE+44 | |
|  | MOV #102, | @BASE+52 | Lower byte to B |
|  | MOV #20, | @BASE+26 | |
|  | TEST READY BIT | | |
|  | MOV #001410, | @BASE+44 | Zero shift |
|  | MOV #103, | @BASE+52 | Upper byte to C |
|  | MOV #20, | @BASE+26 | |

Note: Before this operation, the Upper byte of shifter must be reset. Use K=0 and select F output to upper byte to do this.

CKR: C=0, COMP=0, UI=1, CT=0, U=0, BS=0, K=0
IR: OPCODE = (F=A) = 00
  P = K = 0
  Q = 0
  R = 0 (LB)
CLUP: MOV #00400, @BASE+44
  MOV #600, @BASE+52
  MOV #20, @BASE=26

Note: A maximum of 5 whole picture operations are required.

Example 10: SHIFT PICTURE

Subtract a shifted picture from another picture
Suppose C = A − B (shifted 4 pixels in X and Y directions)

XR: SX = 1 to enable shift
  SELX = B = 2
  DELX = 4₁₀ = 4
YR: SY = 1
  SELY = B = 2
  DELY = 4₁₀ = 4
CKR: as in INITIALIZE (all zeros)
IR: OPCODE = (F=A−B) = 26
  P = A = 1
  Q = B = 2
  R = C = 3

SUBSHF: MOV #12004, @BASE+20
  MOV #12004, @BASE+22
  MOV #26123, @BASE+52
  MOV #20, @BASE+26

Note: It is good policy to reset XR and YR after all shift operations, particularly resetting SX and SY.

Example 11: DIVIDE WITH XF (Divide by any Integer)

i.e. Not a binary operation, use XF.
B = B/3
Prior to the operation, load the B transformation unit XFB with the function $Y = \frac{\cdot}{3}$ (truncated values)

i.e. Byte 0 of XFB contains $\frac{0}{3} = 0$ $\frac{1}{3} = 0$ $\frac{2}{3} = 0$ $\frac{3}{3} = 1$ $\frac{2}{3} = 3$ decimal = 3 octal 255     $\frac{255}{3} = 85_{10} = 125_8$ Select B for data exchange with SEL EXCH = 2 of the CSR, and load XFB from CPU through DR.
Select X = 1 so that transformed output goes to both the display monitor and the processor. This time switch off SEL EXCH.
Set up IR to get B = B/3
i.e.    MOV #202,    @BASE+52
       MOV #120020,    @BASE+26

Note: It is good practice to deselect XF's whenever not required.

MICRO INSTRUCTIONS

Definition of "NORMAL" modes

Assume that, normally, comparisons, bit shifts, upper byte of Output Shifter, picture shifts, data exchange (TEXAC ⇌ CPU of 11T34) and transformation functions are not used. (If preferred, all XF's could be loaded to have 1:1 transformation). Therefore, before an operation of NORMAL modes, initialize the necessary registers to deselect the modes listed above as not NORMAL.

INITIALIZE operation (1:IR, 2:CKR, 3:XR, 4:YR, 5:CTR, 6:DR, 7:CSR)
2. CKR: C=0, (no comparison), BS=0 (no bit shift), all others are don't -continued

```
          cares, hence could be all zeros.
          ∴ Image of CKR: 000000
3,4. XR and YR:    SX and SY = 0 (no picture shift), all others are don't cares,
                   hence could be all zeros.
                   ∴ Image of XR: 000000
                     Image of YR: 000000
5,6. CTR and DR:   not used at all in normal mode
                   ∴ Image of CTR:  DON'T CARE
                     Image of DR:   DON'T CARE
7. CSR:   NORMALLY all bits of CSR except ST and MODE are zeroes particularly
          SEL EXCH, XFC — XFA/D and X. However, this register is also used
          first to TEST the R (Ready) bit for completion of previous operation
          before a new ST and MODE is given.
Therefore, instruction for INITIALIZE are:
INITIALIZE:    MOV #0, @#BASE+44    (CKR)
               MOV #0, @#BASE+20    (XR)
               MOV #0, @#BASE+22    (YR)
          (Note BASE = 166100)
```

Appendix B

```
1. IR: NORMALLY, P, Q, R, OPCODE of this register have to assume values
   as required by the operation.

GENERALIZED SEQUENCE
1. TEST CSR R Bit = 1, Proceed if R = 1
2. INITIALIZE (NORMALLY as above) if necessary
3. Load IR (NORMALLY required)
4. Load CKR
5. Load XR (NORMALLY not required if initialized)
6. Load YR
7. Load CSR with proper MODE digit and the ST bit
8. Go to NEXT Operation (TEXAC WHOLE PICTURE operation or CPU operation).
```

I claim:

1. A system for analyzing a whole picture relative to a set of predetermined image data corresponding to a whole reference picture, comprising:
   scanning means for scanning said whole picture to derive analog image signals corresponding thereto;
   digitizing means for digitizing said analog image signals to produce digital image data representing said whole picture;
   first memory means for storing said digital image data representing said whole picture;
   second memory means for storing said set of predetermined image data corresponding to said whole reference picture;
   first output means for reading out said digital image data representing said whole picture to provide a first output;
   second output means for reading out said set of predetermined image data corresponding to said whole reference picture to provide a second output; and
   processing means for whole picture processing said first output and said second output, whereby to analyze said whole picture relative to said set of predetermined image data corresponding to said whole reference picture;
   said system further comprising video crossbar switch means for routing said digital image data from said digitizing means to said first memory means, and for routing said first output and said second output to said processing means.

2. The system of claim 1, wherein said first memory means comprises a high-speed refresh memory.

3. The system of claim 1, wherein said second memory means comprises a high-speed refresh memory.

4. The system of claim 1, wherein at least one of said first output means and said second output means comprises a transformation unit and means for preloading said transformation unit with transformation data, said transformation unit including means for transforming said image data read out from said at least one of said first output means and said second output means in accordance with said transformation data.

5. The system of claim 4, wherein said transformation data corresponds to desired image enhancement of at least one of said whole picture and said whole reference picture, respectively.

6. The system of claim 1, comprising third memory means for scoring said output of said processing means.

7. The system of claim 1, further comprising instruction register means for receiving and storing instructions corresponding to desired arithmetic and logic operations,
   said processing means comprising arithmetic logic means responsive to said instructions for performing said desired arithmetic and logic operations.

8. The system of claim 1, further comprising instruction register means having a portion for storing an output designation code designating one of said first and second memory means for output,
   said system further comprising an output selector unit responsive to said portion of said instruction register means for selectively routing said output of said processing means to said designated one of said first memory means and said second memory means.

9. The system of claim 1, wherein said processing means, as a result of said whole picture processing, provides output image data representing an altered version of said whole picture.

10. A system for analyzing a whole picture relative to a set of predetermined image data corresponding to a whole reference picture, comprising:
    scanning means for scanning said whole picture to derive analog image signals corresponding thereto;
    digitizing means for digitizing said analog image signals to produce digital image data representing said whole picture;
    first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

said system further comprising means for inputting shift data representing a desired amount of shift of said image data read out by at least one of said first output means and said second output means, said at least one of said first output means and said second output means comprising timing control means for controlling the readout of said image data, said timing control means being responsive to said shift data for selectively delaying or advancing the readout of said image data, whereby to accomplish said desired amount of shift.

11. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

said system further comprising video crossbar switch means for routing said digital image data from said digitizing means to said first memory means, and for routing said first output and said second output to said processing means, and line buffer unit means for receiving, and having an output for providing, input data to said system, said video crossbar switch means being connected to said line buffer unit means for receiving said input data to said system.

12. The system of claim 11, wherein said video crossbar switch means comprises a first selector unit and a second selector unit, each having inputs connected to said first memory means, said second memory means, said digitizing means, and said line buffer unit means, said system further comprising instruction register means having a first and second portion for holding first and second source designation codes, respectively, said first and second selector units being responsive to said first and second source designation codes, respectively, for selecting one of said first memory means, said second memory means, said digitizing means, and said line buffer unit means, for input of data to said processing means.

13. The system of claim 12, wherein said video crossbar switch means comprises a third selector unit having outputs connected to said first memory means, said second memory means, and said line buffer unit means, respectively, said instruction register means having a third portion for holding a destination designation code, said third selector unit being responsive to said destination designation code from said instruction register means for selectively routing said output of said processor means to a corresponding one of said first memory means, said second memory means, and said line buffer unit means.

14. The system of claim 11, wherein said video crossbar switch means comprises an output selector unit having outputs connected to said first memory means, said second memory means, and said line buffer unit means, said system further including instruction register means having a portion for holding a destination designation code, said output selector unit being responsive to said destination designation code for routing said output of said processing means to a corresponding one of said first memory means, said second memory means, and said line buffer unit means.

15. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

said system further comprising video crossbar switch means for routing said digital image data from said digitizing means to said first memory means, and for routing said first output and said second output to said processing means, wherein said video crossbar switch means comprises a first selector unit and a second selector unit, each having inputs connected to said first output means and said second output means;

said system further comprising instruction register means having a first and second portion for holding first and second source designation codes, respectively, said first and second selector units being responsive to said first and second source designation codes, respectively, for selecting one of said first output means and said second output means for input of data to said processing means.

16. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output to form an output of said processing means, whereby to analyze said whole picture relative to said set of predetermined image data corresponding to said whole reference picture;

said system comprising third memory means for storing said output of said processing means, and instruction register means for receiving and providing instructions designating at least one of said first and second memory means as a source memory and another of said memory means as a destination memory, said system including video crossbar switch means responsive to said instructions for routing said image data from said designated source memory to said designated destination memory.

17. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

said system further comprising instruction register means for receiving and storing instructions corresponding to desired arithmetic and logic operations, said processing means comprising arithmetic logic means responsive to said instructions for performing said desired arithmetic and logic operations, wherein said arithmetic logic means includes at least two inputs, said system including video crossbar switch means comprising at least first and second selector units, each having an output connected to a respective one of said two inputs of said arithmetic logic means, said first and second selector units each having a plurality of inputs connected to said first output means and said second output means, respectively, said instruction register means having respective portions for storing first and second source input designation codes, said first and second selectors being responsive to said first and second source input designation codes, respectively, for selectively connecting at least one of said first output means and said second output means to said respective corresponding inputs of said arithmetic logic means.

18. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

said system further comprising instruction register means for receiving and storing instructions corresponding to desired arithmetic and logic operations, said processing means comprising arithmetic logic means responsive to said instructions for performing said desired arithmetic and logic operations, wherein said arithmetic logic means includes an output for providing processing results, said system comprising compare/constant register means having a portion thereof for selectively designating operation in a rotate shift mode or no rotate shift mode, said processing means further comprising an output selector unit responsive to said portion of said compare/constant register means for selectively multiplexing the output of said arithmetic logic means in correspondence to said selection of said rotate shift mode or said no rotate shift mode of operation.

19. A system for analyzing a whole picture relative to a set of predetermined image data corresponding to a whole reference picture, comprising:
scanning means for scanning said whole picture to derive analog image signals corresponding thereto;
digitizing means for digitizing said analog image signals to produce digital image data representing said whole picture;
first memory means for storing said digital image data representing said whole picture;
second memory means for storing said set of predetermined image data corresponding to said whole reference picture;
first output means for reading out said digital image data representing said whole picture to provide a first output;
second output means for reading out said set of predetermined image data corresponding to said whole reference picture to provide a second output; and
processing means for whole picture processing said first output and said second output, whereby to analyze said whole picture relative to said set of predetermined image data corresponding to said whole reference picture;
said system further comprising instruction register means for receiving and storing instructions corresponding to desired arithmetic and logic operations,
said processing means comprising arithmetic logic means responsive to said instructions for performing said desired arithmetic and logic operations, and compare/constant register means having a portion for holding shift-indicating data indicating desired shift of the output of said arithmetic logic means, the direction of said shift, and the amount of said shift,
said processing means further comprising an output shifter unit responsive to said portion of said compare/constant register means for selectively shifting the output of said arithmetic logic means in said desired direction by said desired amount of shift.

20. A system for analyzing a whole picture relative to a set of predetermined image data corresponding to a whole reference picture, comprising:
scanning means for scanning said whole picture to derive analog image signals corresponding thereto;
digitizing means for digitizing said analog image signal to produce digital image data representing said whole picture;
first memory means for storing said digital image data representing said whole picture;
second memory means for storing said set of predetermined image data corresponding to said whole reference picture;
first output means for reading out said digital image data representing said whole picture to provide a first output;
second output means for reading out said set of predetermined image data corresponding to said whole reference picture to provide a second output; and
processing means for whole picture processing said first output and said second output, whereby to analyze said whole picture relative to said set of predetermined image data corresponding to said whole reference picture,
said processing means comprising a comparison logic circuit for performing comparison operations with respect to said first output of said first output means and said second output of said second output means to detect any one of a plurality of predetermined comparison conditions,
said comparison logic circuit issuing respective selection signals upon detection of corresponding ones, respectively, of said comparison conditions,
said processing means comprising a first selector responsive to a predetermined one of said selection signals of said comparison logic circuit for selecting a corresponding one of the next said inputs to said processing means.

21. The system of claim 20, further comprising compare/constant register means for holding a predetermined constant value,
said processing means comprising a second selector connected to said first selector for receiving said selected one of said next inputs to said processing means,
said comparison logic circuit performing comparison operations with respect to said inputs to said processing means and issuing a predetermined second selection signal upon detection of a corresponding one of said comparison conditions,
said second selector being responsive to said predetermined second selection signal for selecting one of said constant value from said compare/constant register means and said output of said first selector.

22. A system for analyzing a whole color picture with respect to a whole reference picture having corresponding reference image data, comprising:
scanning means for scanning said whole color picture to derive analog image signals corresponding thereto;
digitizing means for digitizing said analog image signals to produce corresponding digital image data representing said whole color picture;
first memory means for storing said digital image data representing said whole color picture;
means for providing said reference image data; and
processing means responsive to said reference image data for whole picture processing said digital image data stored in said first memory means in accordance therewith, whereby to analyze said whole color picture;
said system further comprising video crossbar switch means for routing said digital image data from said digitizing means to said first memory means, and for routing said digital image data and said reference image data to said processing means.

23. The system of claim 22, wherein said processing means, as a result of said whole picture processing, provides output image data representing an altered version of said whole color picture,
said system further comprising second memory means for storing said output image data corresponding to said altered version of said whole color picture.

24. The system of claim 22, wherein said first memory means comprises a high-speed refresh memory.

25. The system of claim 22, further comprising instruction register means for receiving and storing instructions corresponding to desired arithmetic and logic operations, said processing means comprising arithmetic logic means responsive to said instructions for performing said desired arithmetic and logic operations.

26. The sytem of claim 22, said processing means comprising a comparison logic circuit for performing comparison operations to detect a plurality of predetermined comparison conditions.

27. A system for analyzing a whole color picture with respect to a whole reference picture having corresponding reference image data, comprising:
scanning means for scanning said whole color picture to derive analog image signals corresponding thereto;
digitizing means for digitizing said analog image signals to produce corresponding digital image data representing said whole color picture;
first memory means for storing said digital image data representing said whole color picture;
means for providing said reference image data; and
processing means responsive to said reference image data for whole picture processing said digital image data stored in said first memory means in accordance therewith, whereby to analyze said whole color picture,
wherein said digital image data processed by said processing means represents corresponding color components of said whole color picture,
said system further comprising a second memory means for storing said output image data processed by said processing means, and a plurality of memory output means, connected to the output of said second memory means, each memory output means reading out a respective one of said color components of said whole color picture,
said system further comprising a plurality of digital-to-analog converter means, one for each of said plurality of memory output means, for converting said read out color components of said image data to analog form, wereby to provide corresponding respective color monitor outputs for display of said altered version of said whole color picture.

28. A system for analyzing a whole color picture with respect to a whole reference picture having corresponding reference image data, comprising:
scanning means for scanning said whole color picture to derive analog image signals corresponding thereto;
digitizing means for digitizing said analog image signals to produce corresponding digital image data representing said whole color picture;
first memory means for storing said digital image data representing said whole color picture;
means for providing said reference image data; and
processing means responsive to said reference image data for whole picture processing said digital image data stored in said first memory means in accordance therewith, whereby to analyze said whole color picture;
said system further comprising first output means for reading out said digital image data stored in said first memory means, and means for inputting shift data representing a desired amount of shift of said digital image data read out by said first output means, said first output means comprising timing control means for controlling the readout of said digital image data, said timing control means being responsive to said shift data for selectively delaying or advancing the readout of said digital image data, whereby to accomplish said desired amount of shift.

29. A system for analyzing a whole color picture with respect to a whole reference picture having corresponding reference image data, comprising:
scanning means for scanning said whole color picture to derive analog image signals corresponding thereto;
digitizing means for digitizing said analog image signals to produce corresponding digital image data representing said whole color picture;
first memory means for storing said digital image data representing said whole color picture;
means for providing said reference image data, and
processing means responsive to said reference image data for whole picture processing said digital image data stored in said first memory means in accordance therewith, whereby to analyze said whole color picture, wherein said processing means provides processed image data as an output, said system comprises second memory means for storing said processed image data provided by said processing means, and instruction register means for receiving and providing instructions designating said first and second memory means as a source memory and a destination memory, respectively, said system including video crossbar switch means responsive to said instructions for routing said image data from said designated source memory to said designated destination memory.

30. A method of analytically processing a whole picture with respect to picture attributes associated with points of said picture to obtain a resultant processed whole picture, said method comprising:
scanning said whole picture to derive image signals corresponding thereto;
processing said image signals to generate digital picture attribute parameters defining corresponding said attributes of said points of said whole picture;
computing a predetermined function of each said digital picture attribute parmeter to obtain an intermediate processed picture; and
repeating said computing step for said intermediate processed picture, and each successive said intermediate picture, to obtain said resultant processed picture;
wherein each said digital picture attribute parameter comprises an l value defining the gray-level value of a corresponding point on said picture, wherein l(+i) represents the gray-level value of a point in said picture a distance i points to the right of the point having the gray-level value represented by l, wherein said computing step comprises execution of the equation $$l' = \frac{l}{2i} + \frac{l(+i)}{2i}$$

for the operand l and for i=1 to obtain the result l', and wherein the repeating step comprises execution of the equation for operands l', l'', . . . and for i=2,3, . . . to obtain the results l'', l''', . . . , $l^n$, wherein $l^n$ corresponds to the resultant processed picture.

31. The method of claim 30, wherein said predetermined function comprises a mean function.

32. The method of claim 30, wherein said predetermined function comprises a variance function.

33. The method of claim 30, wherein said predetermined function comprises a skewness function.

34. A system for analyzing a whole picture relative to a set of predetermined image data corresponding to a whole reference picture, comprising:

scanning means for scanning said whole picture to derive analog image signals corresponding thereto;

digitizing means for digitizing said analog image signals to produce digital image data representing said whole picture;

first memory means for storing said digital image data representing said whole picture;

second memory means for storing said set of predetermined image data corresponding to said whole reference picture;

first output means for reading out said digital image data representing said whole picture to provide a first output;

second output means for reading out said set of predetermined image data corresponding to said whole reference picture to provide a second output; and processing means for whole picture processing said first output and said second output, whereby to analyze said whole picture relative to said set of predetermined image data corresponding to said whole reference picture;

wherein at least one of said first output means and said second output means comprises a transformation unit and means for preloading said transformation unit with transformation data, said transformation unit including means for transforming said image date read out from said at least one of said first output means and said second output means in accordance with said transformation data.

35. The system of claim 34, wherein said transformation data corresponds to desired image enhancement of at least one of said whole picture and said whole reference picture, respectively.

* * * * *